United States Patent
Katcher et al.

(10) Patent No.: US 8,356,329 B2
(45) Date of Patent: Jan. 15, 2013

(54) METHOD AND APPARATUS FOR INTERACTION WITH HYPERLINKS IN A TELEVISION BROADCAST

(75) Inventors: Dan Katcher, Needham, MA (US); Andrew Miller, Natick, MA (US); Jon Dakss, Cambridge, MA (US); Josh Wachman, Brookline, MA (US); David Rose, Cambridge, MA (US); V. Michael Bove, Jr., Wrentham, MA (US); Karen Sarachik, Newton, MA (US); Paul G. Milazzo, Waltham, MA (US); Jon Altschuler, Acton, MA (US)

(73) Assignee: Ericsson Television, Inc., Duluth, GA (US)

( * ) Notice: Subject to any disclaimer, the term of this patent is extended or adjusted under 35 U.S.C. 154(b) by 909 days.

(21) Appl. No.: 11/937,246

(22) Filed: Nov. 8, 2007

(65) Prior Publication Data

US 2008/0066129 A1    Mar. 13, 2008

Related U.S. Application Data

(60) Division of application No. 09/695,900, filed on Oct. 25, 2000, now Pat. No. 7,343,617, which is a continuation-in-part of application No. 09/694,079, filed on Oct. 20, 2000, now Pat. No. 7,367,042.

(60) Provisional application No. 60/185,668, filed on Feb. 29, 2000, provisional application No. 60/229,241, filed on Aug. 30, 2000, provisional application No. 60/233,340, filed on Sep. 18, 2000.

(51) Int. Cl.
*H04N 7/173*    (2006.01)

(52) U.S. Cl. ........................................ 725/113; 725/135
(58) Field of Classification Search ................... 725/51, 725/60, 61, 112, 113, 135, 136
See application file for complete search history.

(56) References Cited

U.S. PATENT DOCUMENTS

| | | | |
|---|---|---|---|
| 4,016,361 | A | 4/1977 | Pandey |
| 4,122,477 | A | 10/1978 | Gallo |
| 4,264,924 | A | 4/1981 | Freeman |

(Continued)

FOREIGN PATENT DOCUMENTS

EP    0 498 511 A1    8/1992

(Continued)

OTHER PUBLICATIONS

Annex for form PCT/ISA/206, PCT International Search Report for International Application No. PCT/US01/10641, mailed on Sep. 12, 2001.

(Continued)

*Primary Examiner* — Ngoc Vu

(57) ABSTRACT

A system and method for adding hyperlinked information to a television broadcast in which an interactive content icon is used. The broadcast material is analyzed and one or more regions within a frame are identified. Additional information can be associated with a region, and can be transmitted in encoded form, using timing information to identify the frame with which the information is associated. A receiver displays the annotation information associated with the video signal in response to a viewer request on a frame by frame basis. The interactive content icon can be used to inform a viewer of the presence of hyperlinked information, for teaching the viewer how to use the system, and for informing the viewer about the hyperlinked information.

11 Claims, 18 Drawing Sheets

U.S. PATENT DOCUMENTS

| | | |
|---|---|---|
| 4,264,925 A | 4/1981 | Freeman et al. |
| 4,507,680 A | 3/1985 | Freeman |
| 4,532,547 A | 7/1985 | Bennett |
| 4,573,072 A | 2/1986 | Freeman |
| 4,602,279 A | 7/1986 | Freeman |
| 4,724,543 A | 2/1988 | Klevecz et al. |
| 4,743,959 A | 5/1988 | Frederiksen |
| 4,748,512 A | 5/1988 | Armstrong |
| 4,792,849 A | 12/1988 | McCalley et al. |
| 4,803,553 A | 2/1989 | Schrock et al. |
| 4,811,407 A | 3/1989 | Blokker, Jr. et al. |
| 4,829,372 A | 5/1989 | McCalley et al. |
| 4,847,698 A | 7/1989 | Freeman |
| 4,847,699 A | 7/1989 | Freeman |
| 4,847,700 A | 7/1989 | Freeman |
| 4,903,317 A | 2/1990 | Nishihara et al. |
| 4,941,040 A | 7/1990 | Pocock et al. |
| 4,959,718 A | 9/1990 | Bennett |
| 5,008,745 A | 4/1991 | Willoughby |
| 5,008,751 A | 4/1991 | Wischermann |
| 5,014,125 A | 5/1991 | Pocock et al. |
| 5,045,940 A | 9/1991 | Peters et al. |
| 5,101,280 A | 3/1992 | Moranaga et al. |
| 5,124,811 A | 6/1992 | Ohsawa et al. |
| 5,130,792 A | 7/1992 | Tindell et al. |
| 5,195,092 A | 3/1993 | Wilson et al. |
| 5,208,665 A | 5/1993 | McCalley et al. |
| RE34,340 E | 8/1993 | Freeman |
| 5,267,333 A | 11/1993 | Aono et al. |
| 5,347,322 A | 9/1994 | Levine et al. |
| 5,371,519 A | 12/1994 | Fisher |
| 5,404,173 A | 4/1995 | Parrish et al. |
| 5,452,006 A | 9/1995 | Auld |
| 5,452,372 A | 9/1995 | Shirasaka et al. |
| 5,499,050 A | 3/1996 | Baldes et al. |
| 5,504,534 A | 4/1996 | Sakaegi |
| 5,526,024 A | 6/1996 | Gaglianello et al. |
| 5,533,021 A | 7/1996 | Branstad et al. |
| 5,541,602 A | 7/1996 | Opris et al. |
| 5,541,662 A | 7/1996 | Adams et al. |
| 5,583,561 A | 12/1996 | Baker et al. |
| 5,585,858 A | 12/1996 | Harper et al. |
| 5,590,262 A | 12/1996 | Isadore-Barreca |
| 5,600,775 A | 2/1997 | King et al. |
| 5,603,058 A | 2/1997 | Belknap et al. |
| 5,630,067 A | 5/1997 | Kindell et al. |
| 5,632,007 A | 5/1997 | Freeman |
| 5,640,601 A | 6/1997 | Peters |
| 5,644,354 A | 7/1997 | Thompson et al. |
| 5,648,824 A | 7/1997 | Dunn et al. |
| 5,655,050 A | 8/1997 | Yamamoto et al. |
| 5,689,799 A | 11/1997 | Dougherty et al. |
| 5,708,845 A | 1/1998 | Wistendahl et al. |
| 5,715,176 A | 2/1998 | Mobini |
| 5,724,091 A | 3/1998 | Freeman et al. |
| 5,727,090 A | 3/1998 | Yellin |
| 5,754,233 A | 5/1998 | Takashima |
| 5,754,250 A | 5/1998 | Cooper |
| 5,757,968 A | 5/1998 | Ando |
| 5,768,431 A | 6/1998 | Saunders et al. |
| 5,771,073 A | 6/1998 | Lim |
| 5,774,664 A | 6/1998 | Hidary et al. |
| 5,774,666 A | 6/1998 | Portuesi |
| 5,786,855 A | 7/1998 | Chen et al. |
| 5,790,269 A | 8/1998 | Masaki et al. |
| 5,805,204 A | 9/1998 | Thompson et al. |
| 5,815,634 A | 9/1998 | Daum et al. |
| 5,818,438 A | 10/1998 | Howe et al. |
| 5,832,121 A | 11/1998 | Ando |
| 5,835,146 A | 11/1998 | Stone |
| 5,838,828 A | 11/1998 | Mizuki et al. |
| 5,845,083 A | 12/1998 | Hamadani et al. |
| 5,848,352 A | 12/1998 | Dougherty et al. |
| 5,861,881 A | 1/1999 | Freeman et al. |
| 5,880,768 A | 3/1999 | Lemmons et al. |
| 5,883,633 A | 3/1999 | Gill et al. |
| 5,883,670 A | 3/1999 | Sporer et al. |
| 5,883,975 A | 3/1999 | Narita et al. |
| 5,889,746 A | 3/1999 | Moriyama et al. |
| 5,903,816 A | 5/1999 | Broadwin et al. |
| 5,905,523 A | 5/1999 | Woodfield et al. |
| 5,907,322 A | 5/1999 | Kelly et al. |
| 5,912,675 A | 6/1999 | Laperriere |
| 5,912,994 A | 6/1999 | Norton et al. |
| 5,918,012 A | 6/1999 | Astiz et al. |
| 5,926,172 A | 7/1999 | Hanley |
| 5,929,849 A * | 7/1999 | Kikinis ............... 725/113 |
| 5,930,797 A | 7/1999 | Hill |
| 5,933,532 A | 8/1999 | Mihara |
| 5,946,318 A | 8/1999 | Post |
| 5,949,410 A | 9/1999 | Fung |
| 5,949,476 A | 9/1999 | Pocock et al. |
| 5,961,603 A | 10/1999 | Kunkel et al. |
| 5,969,715 A | 10/1999 | Dougherty et al. |
| 5,969,755 A | 10/1999 | Courtney |
| 5,977,962 A | 11/1999 | Chapman et al. |
| 5,977,989 A | 11/1999 | Lee et al. |
| 5,978,029 A | 11/1999 | Boice et al. |
| 5,982,445 A | 11/1999 | Eyer et al. |
| 5,990,890 A | 11/1999 | Etheredge |
| 5,991,799 A | 11/1999 | Yen et al. |
| 5,999,970 A | 12/1999 | Krisbergh et al. |
| 6,002,455 A | 12/1999 | Enomoto et al. |
| 6,006,241 A | 12/1999 | Purnaveja et al. |
| 6,006,256 A | 12/1999 | Zdepski et al. |
| 6,006,265 A | 12/1999 | Rangan et al. |
| 6,008,857 A | 12/1999 | Keery et al. |
| 6,009,229 A | 12/1999 | Kawamura |
| 6,014,693 A | 1/2000 | Ito et al. |
| 6,016,152 A | 1/2000 | Dickie |
| 6,018,372 A | 1/2000 | Etheredge |
| 6,018,768 A | 1/2000 | Ullman et al. |
| 6,023,703 A | 2/2000 | Hill |
| 6,025,848 A | 2/2000 | Hanley |
| 6,028,964 A | 2/2000 | Kim |
| 6,038,319 A | 3/2000 | Chari |
| 6,040,871 A | 3/2000 | Andersson |
| 6,049,539 A | 4/2000 | Lee et al. |
| 6,058,430 A | 5/2000 | Kaplan |
| 6,067,107 A | 5/2000 | Travaille et al. |
| 6,072,839 A | 6/2000 | Mondal et al. |
| 6,075,568 A | 6/2000 | Matsuura |
| 6,081,299 A | 6/2000 | Kesselring |
| 6,084,588 A | 7/2000 | De Haan |
| 6,084,912 A | 7/2000 | Reitmeier et al. |
| 6,118,472 A | 9/2000 | Dureau et al. |
| 6,128,365 A | 10/2000 | Bechwati et al. |
| 6,141,002 A | 10/2000 | Kanungo et al. |
| 6,148,081 A | 11/2000 | Syzmanski et al. |
| 6,151,626 A | 11/2000 | Tims et al. |
| 6,157,809 A | 12/2000 | Kambayashi |
| 6,169,541 B1 | 1/2001 | Smith |
| 6,169,573 B1 | 1/2001 | Sampath-Kumar et al. |
| 6,172,674 B1 | 1/2001 | Etheredge |
| 6,181,334 B1 | 1/2001 | Freeman et al. |
| 6,204,843 B1 | 3/2001 | Freeman et al. |
| 6,204,885 B1 | 3/2001 | Kwoh |
| 6,205,231 B1 | 3/2001 | Isadore-Barreca et al. |
| 6,215,484 B1 | 4/2001 | Freeman et al. |
| 6,215,526 B1 | 4/2001 | Barton |
| 6,223,211 B1 | 4/2001 | Hamilton et al. |
| 6,229,541 B1 | 5/2001 | Kamen et al. |
| 6,233,253 B1 | 5/2001 | Settle et al. |
| 6,239,815 B1 | 5/2001 | Frink et al. |
| 6,240,555 B1 | 5/2001 | Shoff et al. |
| 6,259,807 B1 | 7/2001 | Ravkin |
| 6,263,505 B1 | 7/2001 | Walker et al. |
| 6,282,713 B1 | 8/2001 | Kitsukawa et al. |
| 6,314,572 B1 | 11/2001 | LaRocca et al. |
| 6,317,774 B1 | 11/2001 | Jones et al. |
| 6,341,178 B1 | 1/2002 | Parker |
| 6,357,042 B2 | 3/2002 | Srinivasan et al. |
| 6,400,831 B2 | 6/2002 | Lee et al. |
| 6,411,725 B1 * | 6/2002 | Rhoads ............... 382/100 |
| 6,415,438 B1 | 7/2002 | Blackketter et al. |
| 6,452,598 B1 | 9/2002 | Rafey et al. |
| 6,473,804 B1 | 10/2002 | Kaiser et al. |

| | | |
|---|---|---|
| 6,496,981 B1 | 12/2002 | Wistendahl et al. |
| 6,501,853 B1 | 12/2002 | Gregg et al. |
| 6,614,930 B1 | 9/2003 | Agnihotri et al. |
| 6,615,408 B1 | 9/2003 | Kaiser et al. |
| 6,675,384 B1 | 1/2004 | Block et al. |
| 6,728,412 B1 | 4/2004 | Vasylyev |
| 6,738,982 B1 | 5/2004 | Jerding |
| 6,765,557 B1 | 7/2004 | Segal et al. |
| 6,785,329 B1 | 8/2004 | Pan et al. |
| 6,816,628 B1 | 11/2004 | Sarachik et al. |
| 6,928,652 B1 | 8/2005 | Goldman |
| 2001/0023436 A1 | 9/2001 | Srinivasan |
| 2001/0033739 A1 | 10/2001 | Oguro et al. |
| 2002/0052891 A1 | 5/2002 | Michaud et al. |
| 2002/0056136 A1* | 5/2002 | Wistendahl et al. .......... 725/135 |
| 2003/0005463 A1 | 1/2003 | MaCrae et al. |
| 2003/0086613 A1 | 5/2003 | Kaneko et al. |
| 2003/0131356 A1 | 7/2003 | Proehl et al. |
| 2003/0189668 A1 | 10/2003 | Newnam et al. |
| 2004/0040042 A1 | 2/2004 | Feinleib |
| 2004/0261131 A1 | 12/2004 | Zigmond et al. |
| 2005/0097622 A1* | 5/2005 | Zigmond et al. .............. 725/135 |
| 2005/0166257 A1 | 7/2005 | Feinleib et al. |

FOREIGN PATENT DOCUMENTS

| | | |
|---|---|---|
| EP | 0 596 823 A2 | 5/1994 |
| EP | 0 596 823 A3 | 5/1994 |
| EP | 0 596 823 B1 | 5/1994 |
| EP | 0 649 102 A2 | 4/1995 |
| EP | 0 680 213 A2 | 11/1995 |
| EP | 0 680 213 A3 | 5/1996 |
| EP | 0 649 102 A3 | 6/1996 |
| EP | 0 752 786 A1 | 1/1997 |
| EP | 0 782 065 A | 7/1997 |
| EP | 0 834 798 A | 4/1998 |
| EP | 0 840 241 A | 5/1998 |
| EP | 0841 610 A3 | 5/1998 |
| EP | 0 858 225 A | 8/1998 |
| EP | 0 866 614 A1 | 9/1998 |
| EP | 0 920 891 A1 | 6/1999 |
| EP | 0 928 105 A | 7/1999 |
| EP | 0 954 176 A2 | 11/1999 |
| EP | 0 954 179 A2 | 11/1999 |
| EP | 0 680 213 B1 | 2/2000 |
| EP | 0 977 389 A2 | 2/2000 |
| EP | 0 988 876 A1 | 3/2000 |
| EP | 0 649 102 B1 | 5/2000 |
| EP | 1 005 885 A1 | 6/2000 |
| EP | 1 050 328 A1 | 11/2000 |
| EP | 1 051 039 A | 11/2000 |
| EP | 1 052 854 A1 | 11/2000 |
| EP | 1 061 739 A2 | 12/2000 |
| EP | 1 089 279 A2 | 4/2001 |
| EP | 1 098 532 A2 | 5/2001 |
| EP | 1 098 533 A2 | 5/2001 |
| EP | 1 098 534 A2 | 5/2001 |
| JP | 5 512 4361 | 9/1980 |
| JP | 0 717 0410 | 7/1995 |
| JP | 1 102 7540 | 1/1999 |
| WO | WO 96/36007 | 11/1996 |
| WO | WO 97/22083 | 6/1997 |
| WO | WO 97/29458 | 8/1997 |
| WO | WO 97/33434 | 9/1997 |
| WO | WO 97/33437 | 9/1997 |
| WO | WO 97/37497 | 10/1997 |
| WO | WO 98/10586 | 3/1998 |
| WO | WO 98/11513 | 3/1998 |
| WO | WO 98/18259 | 4/1998 |
| WO | WO 98/41020 | 9/1998 |
| WO | WO 98/43437 | 10/1998 |
| WO | WO 98/44435 | 10/1998 |
| WO | WO 98/47084 | 10/1998 |
| WO | WO 98/51077 | 11/1998 |
| WO | WO 98/57718 | 12/1998 |
| WO | WO 99/10822 | 3/1999 |
| WO | WO 99/10871 | 3/1999 |
| WO | WO 99/23774 | 5/1999 |
| WO | WO 99/23825 | 5/1999 |
| WO | WO 99/23833 | 5/1999 |
| WO | WO 99/49658 | 9/1999 |
| WO | WO 99/52045 | 10/1999 |
| WO | WO 99/52075 | 10/1999 |
| WO | WO 99/52081 | 10/1999 |
| WO | WO 99/52282 | 10/1999 |
| WO | WO 99/52283 | 10/1999 |
| WO | WO 99/52290 | 10/1999 |
| WO | WO 99/52294 | 10/1999 |
| WO | WO 99/52296 | 10/1999 |
| WO | WO 99/54879 | 10/1999 |
| WO | WO 00/07361 | 2/2000 |
| WO | WO 00/13414 | 3/2000 |
| WO | WO 00/16544 | 3/2000 |
| WO | WO 00/18136 | 3/2000 |
| WO | WO 00/21207 | 4/2000 |
| WO | WO 00/31972 | 6/2000 |
| WO | WO 00/39947 | 7/2000 |
| WO | WO 00/40004 | 7/2000 |
| WO | WO 00/40007 | 7/2000 |
| WO | WO 00/45599 | 8/2000 |
| WO | WO 00/46680 | 8/2000 |
| WO | WO 00/46753 | 8/2000 |
| WO | WO 00/46754 | 8/2000 |
| WO | WO 00/63848 | 10/2000 |
| WO | WO 00/64166 | 10/2000 |
| WO | WO 00/77664 A2 | 12/2000 |
| WO | WO 01/17256 A1 | 3/2001 |
| WO | WO 01/17257 A1 | 3/2001 |
| WO | WO 01/17258 A1 | 3/2001 |
| WO | WO 01/17259 A1 | 3/2001 |
| WO | WO 01/17260 A1 | 3/2001 |
| WO | WO 01/17261 A1 | 3/2001 |
| WO | WO 01/18676 A1 | 3/2001 |
| WO | WO 01/18678 A2 | 3/2001 |
| WO | WO 01/18706 A2 | 3/2001 |
| WO | WO 01/24027 A1 | 4/2001 |
| WO | WO 01/39485 A2 | 5/2001 |
| WO | WO 01/67388 A2 | 9/2001 |

OTHER PUBLICATIONS

Benson, K. Blair (Editor and Coauthor), Television Engineering Handbook, 3 sheets, Copyright 1992, 1986 by McGraw-Hill, Inc., New York, New York.

Bove et al., "Adding Hyperlinks to Digital Television", pp. 795-801, SMPTE Journal, SMPTE Inc., Scarsdale, N.Y., US, vol. 108, No. 11, Nov. 1999.

Brigger and Kunt, "Morphological Shape Representation for Very Low Bit-Rate Video Coding", pp. 297-311, Signal Processing: Image Communication, NL, Elsevier Science Publishers, Amsterdam, vol. 7, No. 4.

Burill et al., "Time-Varying Sensitive Regions in Dynamic Multimedia Objects: a Pragmatic Approach to Content-Based Retrieval From Video", pp. 213-223, Information and software Technology 1994.

Chalom, "Statistical Image Sequence Segmentation Using Multidimensional Attributes", 202 pgs., Massachusetts Institute of Technology Philosophy Thesis, Jan. 1998.

Chalom, et al., "Segmentation of an Image Sequence Using Multi-Dimensional Image Attributes", 4 pgs., Proceedings of the ICIP-96,__ Sep. 1996.

Co-pending U.S. Appl. No. 09/943,583, filed Aug. 30, 2001, entitled Method and Apparatus for Hyperlinking in a Television Broadcast.

Co-pending U.S. Appl. No. 09/715,944, filed Nov. 17, 2000, entitled Method and Apparatus for Receiving a Hyperlinked Television Broadcast.

Co-pending U.S. Appl. No. 09/697,479, filed Oct. 26, 2000, entitled Single-Pass Multilevel Method for Applying Morphological Operators in Multiple Dimensions.

Co-pending U.S. Appl. No. 09/697,483, filed Oct. 26, 2000, entitled Method and Apparatus for Encoding Video Hyperlinks.

Co-pending U.S. Appl. No. 09/697,774, filed Oct. 26, 2000, entitled: Methods for Outlining and Filling Regions in Multi-Dimensions Arrays.

Co-pending U.S. Appl. No. 09/697,775, filed Oct. 26, 2000, entitled Method and Apparatus for Generating Data Structures for a Hyperlinked Television Broadcast.

Co-pending U.S. Appl. No. 09/747,677, filed Dec. 22, 2000, Entitled: A Method and Apparatus for Switching Between Multiple Programs by Interacting with a Hyperlinked Television Broadcast.

Dakss et al., "Hyperlinked Video", Proceedings of the SPIE Conference on Multimedia Systems and Applications, Boston, Nov. 1998, SPIE vol. 3528.

Eisen, I.R. et al.; Visual Behavior of Multimedia Hypervideo Links for Motion Video; IBM Technical Disclosure Bulletin; vol. 37, No. 01; (1994); p. 409.

Fitzpatrick, G.P. et al.; User-Controlled Display of Hypermedia Links via Mouse Location; IBM Technical Disclosure Bulletin; vol. 36, No. 08; (1993); p. 669.

Ginige et al. "Hypermedia Authoring" pp. 24-35, University of Technology, Sydney, IEEE MultiMedia, Winter 1995.

Hirata et al, "Content-Oriented Integration in Hypermedia Systems", (pp. 11-21), Washington,, Mar. 16-20, 1996, New York,_CM,US, vol._CONF.7, Mar. 16, 1996.

IBM Technical Disclosure Bulletin, "User-Controlled Display of Hypermedia Links Via Mouse Location", p. 669, vol. 36, No. 8, Aug. 1993.

IBM Technical Disclosure Bulletin, "Visual Behavior of Multimedia Hypervideo Links for Motion Video", p. 409, vol. 37, No. 1, Jan. 1994.

Nakanishi; *An Image Reduction Method Using MR Codes*; pp. 1-10, Systems and Computer in Japan; vol. 28, No. 7; 1997.

Pardas et al., "3D Morphological Segmentation for Image Sequence Processing", pp. 6.1_3.1-6.1_3.6, Nonlinear Digital Signal Processing, Jan. 17-20, 1993, Barcelona, Spain. [online], [retrieved from the Internet] <URL:http://ieeexplore.ieee.org/ie15/6208/16581/0076773.pdf> [retired on Jul. 16, 2001] abstract.

PCT International Search Report for Internati onal Application No. PCT/US01/06461, mailed on Aug. 20, 2001.

PCT International Search Report for International Application No. PCT/US01/06351, mailed on Aug. 20, 2001.

PCT International Search Report for International Application No. PCT/US01/06458, mailed on Aug. 20, 2001.

PCT International Search Report for International Application No. PCT/US01/27046, mailed on Nov. 14, 2001.

PCT International Search Report for International Application No. PCT/US01/06411, mailed on Dec. 13, 2001.

Salembier et al., "Segmentation-Based Video Coding System Allowing the Manipulation of Objects", pp. 60-73, IEEE Transactions on Circuits and Systems for Video Technology, IEE Inc., New York, US, vol. 7, No. 1, Feb. 1997.

Tonomura, "Video Handling Based on Structured Information for Hypermedia Systems", pp. 333-344, In Proceedings International Conference on Multimedia Information Systems, Singapore, 1991.

Tsunashima, Kenji et al., An Integrated DTV Receiver for ATSC Digital Television Standard, 1998 IEEE, 0-7803-4357-3/98, pp. 148-149, Mitsubishi Electric Corporation, Kyoto, Japan.

Vasconcelos et al., "Learning Mixture Hierarchies", 7 pgs., NIPS'98, 1998.

Vass et al., "Automatic Spatio-Temporal Video Sequence Segmentation", pp. 958-962, Proceedings of the 1998 Conference on Image Processing, Oct. 4-7, 1998, Chicago, IL, USA, [online], [retrieved from the Internet] <URL:http://ieexplore.ieee.org/ie14/5852/15617/0072368.1.pdf>, [retrieved on Jul. 16, 2001], abstract.

\* cited by examiner

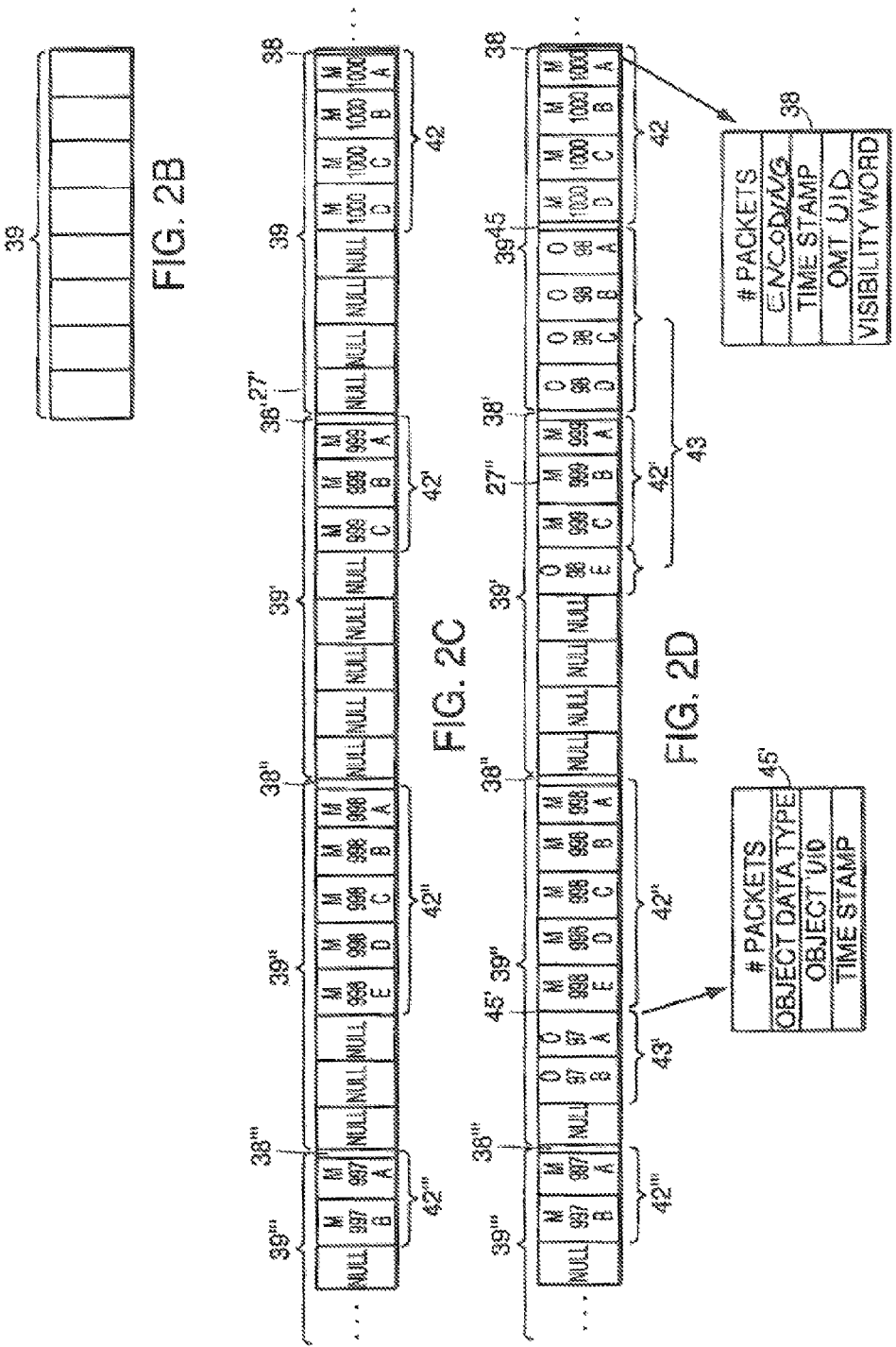

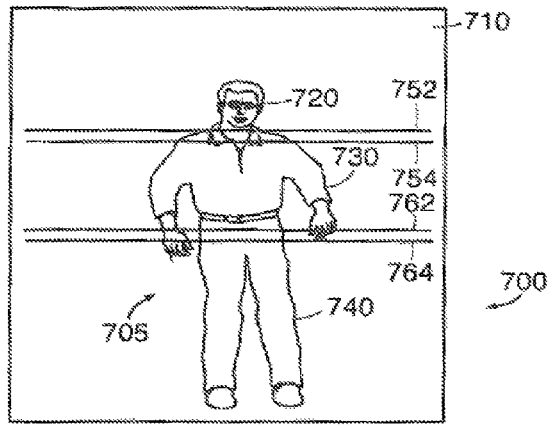

FIG. 9A

NO. ROWS (=3)
ROW 1: (COLOR$_1$, N$_1$), (COLOR$_2$, N$_2$), (COLOR$_3$, N$_3$), ... (COLOR$_N$, N$_N$)
ROW 2: N$_1$, N$_2$, N$_3$, ..., N$_N$
ROW 3: N$_1$, N$_2$, N$_3$, ..., N$_N$

FIG. 9B (VALUE INDICATOR OF COLOR, RUN LENGTH, OFFSET)
FIG. 9C

NO. ROWS (=3)
ROW 1: (COLOR$_1$, RUNLENGTH$_1$,OFFSET$_1$), (COLOR$_2$, RUNLENGTH$_2$,OFFSET$_2$)
....(COLOR$_N$, RUNLENGTH$_N$,OFFSET$_N$)
ROW 2: (RUNLENGTH$_1$,OFFSET$_1$), (RUNLENGTH$_2$,OFFSET$_2$),....(RUNLENGTH$_N$,OFFSET$_N$)
ROW 3: (RUNLENGTH$_1$,OFFSET$_1$), (RUNLENGTH$_2$,OFFSET$_2$),....(RUNLENGTH$_N$,OFFSET$_N$)

FIG. 9D

METHOD AND APPARATUS FOR INTERACTION WITH HYPERLINKS IN A TELEVISION BROADCAST

CROSS-REFERENCE TO RELATED APPLICATION(S)

This application is a divisional of U.S. patent application Ser. No. 09/695,900 filed Oct. 25, 2000, now U.S. Pat. No. 7,343,617, which is a continuation-in-part of a U.S. application Ser. No. 09/694,079, filed Oct. 20, 2000, now U.S. Pat. No. 7,367,042, which claims the benefit of U.S. Provisional Application Ser. No. 60/185,668, filed Feb. 29, 2000, U.S. Provisional Application Ser. No. 60/229,241, filed Aug. 30, 2000, and U.S. Provisional Application Ser. No. 60/233,340, filed Sep. 18, 2000, the content of each of which is incorporated herein by reference.

FIELD OF THE INVENTION

The invention relates to the field of broadcast television and more specifically to the field of hyperlinking in a television broadcast.

BACKGROUND OF THE INVENTION

Broadcasts of information via television signals are well known in the prior art. Television broadcasts are unidirectional, and do not afford a viewer an opportunity to interact with the material that appears on a television display. Viewer response to material displayed using a remote control is known but is generally limited to selecting a program for viewing from a listing of available broadcasts. In particular, it has proven difficult to create hyperlinked television programs in which information is associated with one or more regions of a screen. The present invention addresses this need.

SUMMARY OF THE INVENTION

The invention provides methods and systems for augmenting television broadcast material with information that is presented to a viewer in an interactive manner.

In one aspect, the invention features a method of indicating to a viewer of a hyperlinked television broadcast regions of an image that have associated therewith hyperlinked information. The method involves, for a region having hyperlinked information associated therewith, displaying said region within a television broadcast image with a modified visual effect. In one embodiment, the method also includes displaying said region within a television broadcast image with a modified visual effect that persists for a period of less than one second. In one embodiment, the persistence period of the modified visual effect is in the range of one-tenth second to one-quarter second. In one embodiment, the display of a region with a modified visual effect occurs in response to a request from a viewer. In one embodiment, the display of a region with a modified visual effect occurs in response to a change in the content of an image. In one embodiment, the display of a region with a modified visual effect occurs in response to a signal associated with said television broadcast. In one embodiment, the modified visual effect comprises a change in color, a change in luminosity, or an addition of an alphanumeric character.

In another aspect the invention relates to a method of indicating to a viewer of a hyperlinked television broadcast that a region of an image has associated therewith hyperlinked information. The method includes displaying an interactive content icon indicative that a region within a television broadcast image has hyperlinked information associated therewith. In one embodiment, the interactive content icon is displayed in a configuration substantially similar to a subset of the buttons on a remote control. In one embodiment, the interactive content icon is displayed with a visual effect that changes with time, simulating the action of depressing one or more buttons of said remote control. In one embodiment, the displayed interactive content icon includes a display of text that explains the functionality of the one or more buttons. In some embodiments, the interactive content icon is displayed in response to a signal contained within the broadcast, in response to a change in the image that is displayed, or when a region that has associated annotation data becomes visible in a displayed image. In one embodiment, the interactive content icon is displayed in response to a viewer's use of a remote control. In one embodiment, the interactive content icon conveys information about the content of said hyperlinked information associated with a region. In one embodiment, the interactive content icon conveys information about the number of regions having said hyperlinked information associated therewith. In one embodiment, the interactive content icon conveys information about an action associated with a region, the action comprising displaying at least one of text and graphics and switching to another video stream. In one embodiment, the interactive content icon includes an alphanumeric character. In one embodiment the alphanumeric character represents a time period remaining until an interaction opportunity will occur.

The foregoing and other objects, aspects, features, and advantages of the invention will become more apparent from the following description and from the claims.

BRIEF DESCRIPTION OF THE DRAWINGS

FIG. 2B is a diagram of a mask packet set;.

FIG. 2C is a diagram of an initial encoded data packet stream;

FIG. 2D is a diagram of a final encoded data packet stream;

FIGS. 9A through 9D depict illustrative embodiments of compression methods for video images, according to the principles of the invention;

DESCRIPTION OF THE PREFERRED EMBODIMENT

Figure 1A:
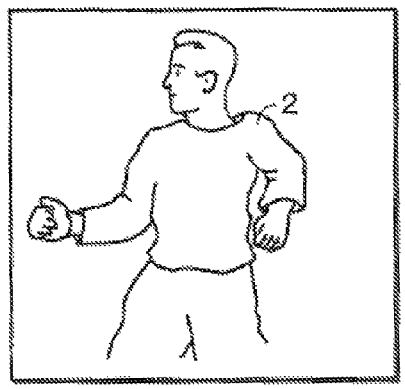
FIGS. 1A-1D depict a series of frames of video as produced by the system of the invention.
Figure 1B:
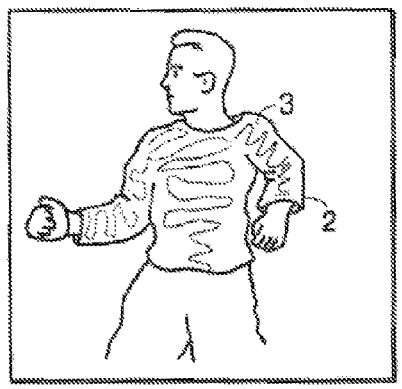
Figure 1C:
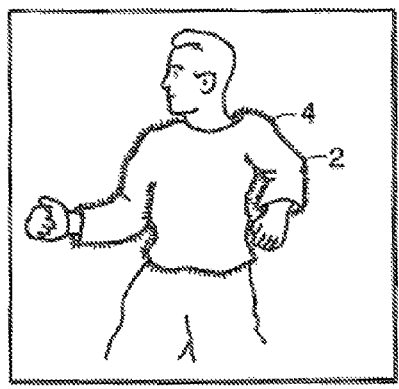

In brief overview, the invention provides a way for annotation information to be associated with objects displayed in the frames of a broadcast video and displayed upon command of a viewer. For example, referring to FIG. 1, annotation information, in the form of store, price and availability information may be associated with a specific shirt 2 worn by an actor in a television broadcast (FIG. 1A). To achieve this, the shirt 2 is first identified to the system by a designer operating a portion of the system called the authoring system. The designer identifies 3 the shirt 2 in a given frame, for example by coloring in the shirt (FIG. 1B), and the system keeps track of the location of the shirt 2 in the preceding and subsequent frames. The designer also generates the text that becomes the annotation data 5 associated with the shirt 2. Thus in this example the annotation data may include the names of stores in which the shirt 2 may be purchased, the price of the shirt 2 and the colors available. The system then denotes that the shirt 2 has annotation data associated with it, for example by outlining 4 the shirt 2 in a different color within the frame (FIG. 1C).

Figure 1D:
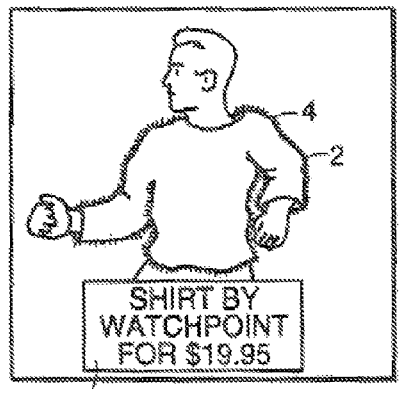

When the show is broadcast to a viewer by the transmission portion of the system, not only is the video broadcast, but also the mask which outlines the shirt 2 and the annotation data which accompanies the shirt 2. The receiver portion of the system at the viewer's location receives this data and displays the video frames along with masks that outline the objects which have associated annotation data. In this example the shirt 2 in the video frame is outlined. If the viewer of the broadcast video wishes to see the annotation data, he or she simply uses the control buttons on a standard remote control handset to notify the receiver portion of the system that the display of annotation data is desired. The system then displays the annotation data S on the screen along with the object (FIG. 1D). In this way denoted objects act as hyperlinks to additional information.

Figure 2:
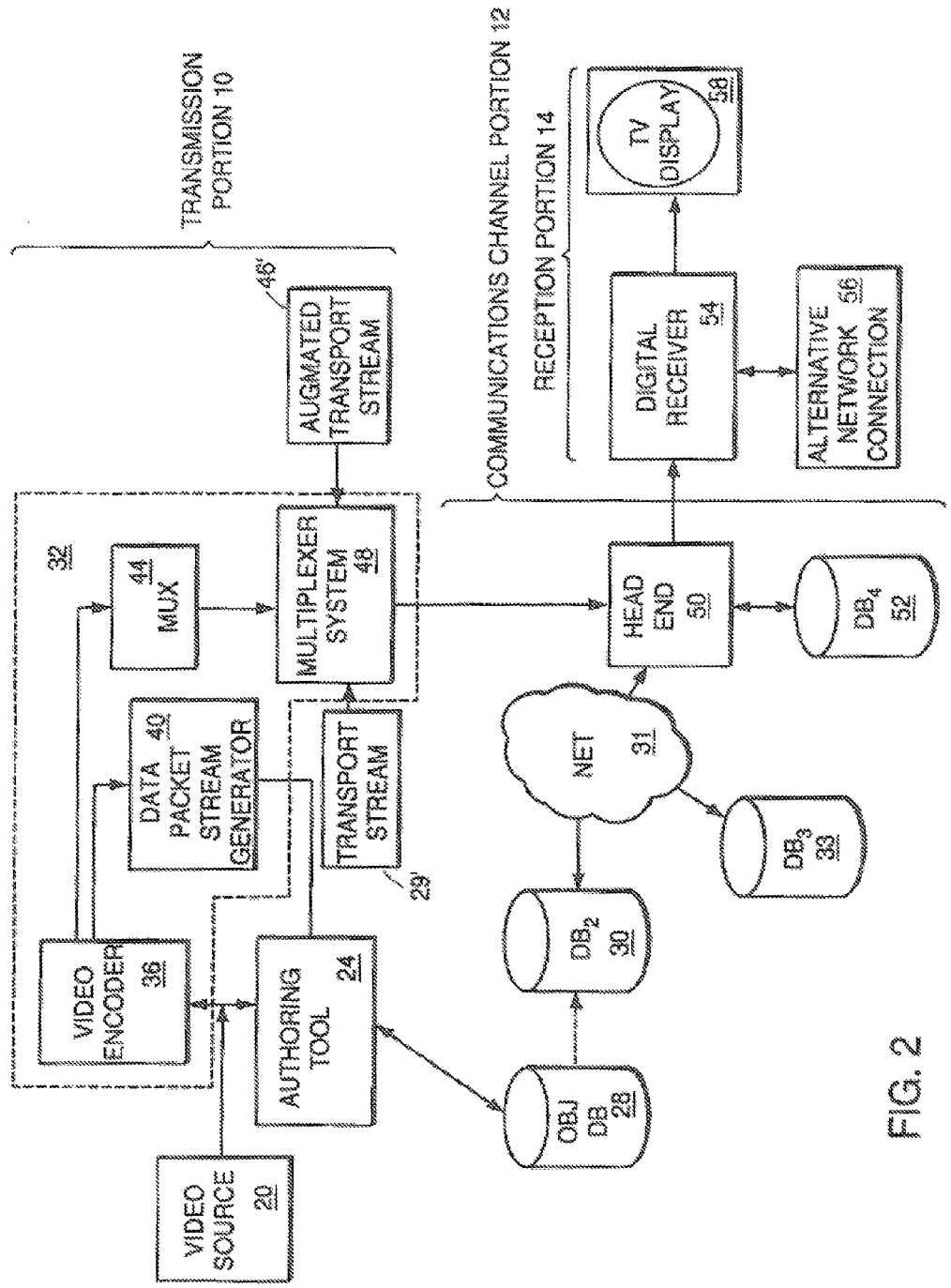
FIG. 2 is a block diagram of an embodiment of a hyperlinked video system constructed in accordance with the invention.
Figure 2A:
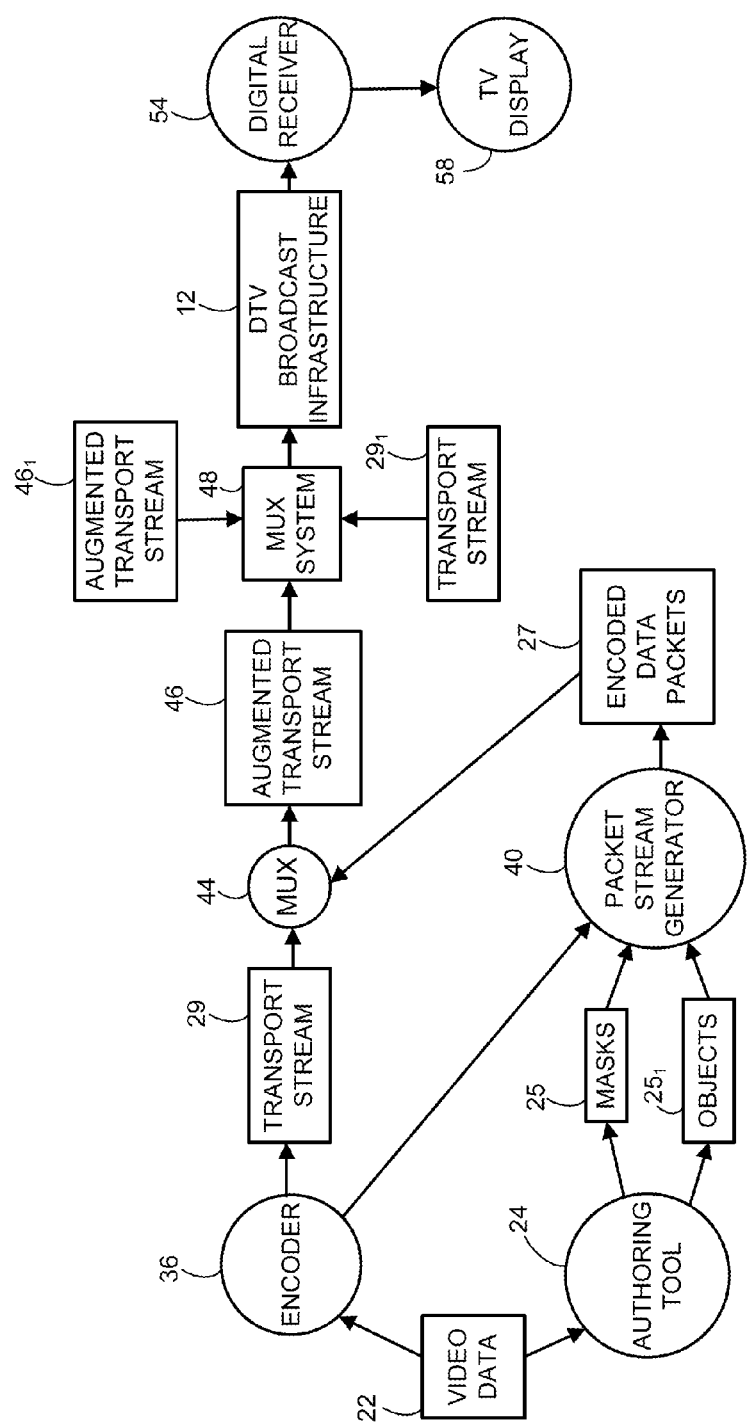
FIG. 2A is a block diagram of the flow of data in the embodiment of the system shown in FIG. 2.

Referring to FIGS. 2 and 2A, a hyperlinked video broadcast system constructed in accordance with the invention includes a transmission portion 10, a communications channel portion 12 and a reception portion 14. The transmission portion 10 includes a video source 20, an authoring tool 24, a database storage system 28 and a transmitter 32. The video source 20 in various embodiments is a video camera, a video disk, tape or cassette, a video feed or any other source of video known to one skilled in the art. The authoring tool 24, which is an annotation source, receives video data from the video source 20 and displays it for a video designer to view and manipulate as described below. Annotation data, for example, the text to be displayed with the video image, is stored in an object database 28 and sent to the transmitter 32 for transmission over the communications channel portion 12 of the system.

The transmitter 32 includes a video encoder 36, a data packet stream generator 40, and a multiplexer (mux) 44 which combines the signals from the video encoder 36 and the data packet stream generator 40 for transmission over the communications channel 12. The video encoder 36 may be any encoder, such as an MPEG or MPEG2 encoder, for producing a transport stream, as is known to one skilled in the art. The data packet stream generator 40 encodes additional data, as described below, which is to accompany the video data when it is transmitted to the viewer. The data packet stream generator 40 generates encoded data packets. The mux 44 produces an augmented transport stream.

The communications channel portion 12 includes not only the transmission medium such as cable, terrestrial broadcast infrastructure, microwave link, or satellite link, but also any intermediate storage which holds the video data until received by the reception portion 14. Such intermediate broadcast storage may include video disk, tape or cassette, memory or other storage devices known to one skilled in the art. The communications channel portion also includes the headend transmitter 50, supplied by a multiple services operator.

The reception portion 14 includes a digital receiver 54, such as a digital setup box, which decodes the signals for display on the television display 58. The digital receiver hardware 54 is any digital receiver hardware 54 known to one skilled in the art.

In operation and referring also to FIGS. 2 and 2A, a designer loads video data 22 from a video source 20 into the authoring tool 24. The video data 22 is also sent from the video source 20 to the video encoder 36 for encoding using, for example, the MPEG standard. Using the authoring tool 24 the designer selects portions of a video image to associate with screen annotations. For example, the designer could select a shirt 2 worn by an actor in the video image and assign annotation data indicating the maker of the shirt 2, its purchase price and the name of a local distributor. Conversely, annotation data may include additional textual information about the object. For example, annotation data in a documentary program could have biographical information about the individual on the screen. The annotation data 5 along with information about the shape of the shirt 2 and the location of the shirt 2 in the image, which is the mask image, as described below, are stored as data structures 25, 25' in a database 28.

Once a designer has authored a given program, the authoring tool determines the range over which objects appear and data structures are utilized in the annotated program. This information is used by the current inventive system to ensure that the data enabling viewer interactions with an object is transmitted before the object is presented to the viewer. This information is also used by the current inventive system to determine when data is no longer required by a program and can be erased from the memory 128 discussed below.

As described above, this annotation data is also sent to the data packet stream generator 40 for conversion into an encoded data packet stream 27. Time stamp data in the transport stream 29' from the video encoder 36 is also an input signal into the data packet stream generator 40 and is used to synchronize the mask and the annotation data with the image data. The data packet stream generator 40 achieves the synchronization by stepping through a program and associating the timing information of each frame of video with the corresponding mask. Timing information can be any kind of information that allows the synchronization of video and mask information. For example, timing information can be timestamp information as generated by an MPEG encoder, timecode information such as is provided by the SMPTE timecode standard for video, frame numbering information such as a unique identifier for a frame or a sequential number for a frame, the global time of day, and the like. In the present illustration of the invention, timestamp information will be used as an exemplary embodiment.

The encoded video data from the video encoder 36 is combined with the encoded data packet stream 27 from the data packet stream generator 40 in a multiplexer 44 and the resulting augmented transport stream 46 is an input to a multiplexer system 48. In this illustrative embodiment the multiplexer system 48 is capable of receiving additional transport 29' and augmented transport 46' streams. The transport 29' and augmented transport 46' streams include digitally encoded video, audio, and data streams generated by the system or by other methods known in the art. The output from the multiplexer system 48 is sent to the communications channel 12 for storage and/or broadcast. The broadcast signal is sent to and received by the digital receiver 54. The digital receiver 54 sends the encoded video portion of the multiplexed signal to the television 58 for display. The digital receiver 54 also accepts commands from a viewer, using a handheld remote control unit, to display any annotations that accompany the video images. In one embodiment the digital receiver 54 is also directly in communication with an alternative network connection 56 (FIG. 2).

In an alternative embodiment, information from the object database 28 is transferred to a second database 30 in FIG. 2 for access through a network 31, such as the Internet, or directly to a database 33. In this embodiment the headend 50 accesses the annotation object data stored on the second database 30 when so requested by the viewer. This arrangement is useful in cases such as when the viewer has recorded the program for viewing at a later time and the recording medium cannot record the annotation data, or when the data cannot be transmitted in-band during the program. Thus when the recorded image is played back through the digital receiver 54, and the viewer requests annotation data, the digital receiver 54 can instruct the headend 50 to acquire the data through the network 31. In addition, the headend 50, under the command of the digital receiver 54, would be able to write data to a database 33 on the network 31 or to a headend database 52. Such data written by the headend 50 may be marketing data indicating which objects have been viewed or it could be order information required from the viewer to order the displayed item over the network. A third embodiment combines attributes of the preceding embodiments in that some of the information is included in the original broadcast and some is retrieved in response to requests by the viewer.

In more detail with respect to the encoded data packet stream 27, and referring to FIGS. 2B, 2C, and 2D, the data packet stream generator 40 is designed to generate a constant data rate stream despite variations in the size of the mask data and annotation data corresponding to the video frames. The data packet stream generator 40 achieves this through a three step process. First the data packet stream generator 40 determines an acceptable range of packet rates which can be inputted into the multiplexer 44. Next, the data packet stream generator 40 determines the number of packets filled by the largest mask in the program being encoded. This defines the number of packets in each mask packet set 39. That is, the number of packets that are allocated for the transport of each mask. In the example shown in FIGS. 2B, 2C, and 2D there are eight packets in each mask packet set 39. Using this number, the data packet stream generator 40 generates an initial version of the encoded data packet stream 27', allocating a fixed number of packets for each mask. If the number of packets required to hold a particular mask is less than the fixed number, then the data packet stream generator 40 buffers the initial encoded data packet stream 27' with null packets. The number of null packets depends on the number of packets remaining after the mask data has been written. In FIG. 2C the mask data 42 for frame 1000 fills four packets thereby leaving four packets to be filled by null packets. Similarly the data 42', 42", 42''', for mask 999, mask 998, and mask 997 require three, five and two packets respectively. This leaves five, three, and six packets respectively to be filled by null packets.

Lastly, the data packet stream generator 40 generates the final encoded data packet stream 27" by adding the object data. The data packet stream generator 40 does this by determining, from information provided by the authoring tool 24, the first occurrence that a given object has in a program. Data corresponding to that object is then inserted into the initial encoded data packet stream 27' starting at some point before the first occurrence of that object. The data packet stream generator 40 steps backwards through the initial encoded data packet stream 27' replacing null packets with object data as necessary. For example, in FIG. 2D object 98 is determined to appear in frame 1001. This means that all of the data associated with object 98 must arrive before frame 1001. The data 43 for object 98 fills five packets, O98A, O98B, O98C, O98D, and O98E, and has been added to the sets of packets allocated to mask data 1000 and mask data 999. The data 43' for object 97 fills two packets, O97A and O97B, and has been added to the set of packets allocated to mask data 998.

To facilitate the process of extracting data from the transport stream in one embodiment, the multiplexer 44 associates the mask data and the object data with different packet identifiers (PIDs) as are used to identify elementary streams in the MPEG2 standard. In this way the digital receiver 54 can route mask and object data to different computing threads based solely on their PIDs, thereby eliminating the need to perform an initial analysis of the contents of the packets. In reassembling the masks and object data, the digital receiver 54 is able to extract the appropriate number of packets from the stream because this information is provided by the data packet stream generator 40 as part of the encoding process. For example referring to FIG. 2D, the data packet stream generator 40 would specify that the mask 1000 filled four packets 42 and that the data 43 for object 98 filled five packets. This data is included in a header 38, 38', 38", 38''' portion of the packet which occupies the first sixteen bytes of the first packet of each mask packet set.

As shown in an enlarged view of the mask header 38 in FIG. 2D, the header packet 5 includes information relating to the number of packets carrying mask information, encoding information, timestamp information, visibility word information, and the unique identifier (UID) of the object mapping table associated with the particular mask. UIDs and object mapping tables are discussed below in more detail with respect to FIGS. 5A-5B. Similarly, the first packet for each object begins with a sixteen byte header 45, 45' that contains information that enables the digital receiver 54 to extract, store and manipulate the data in the object packets 43, 43'. Also, as shown in an enlarged view of the object data header 45 in FIG. 2D, the object data header information includes the number of packets carrying data for the particular object, the object's data type, the object's UID, and timestamp related information such as the last instance that the object data is used in the program. The type of data structures employed by the system and the system's use of timestamps is discussed below in more detail with respect to FIGS. 5A-5B, 6, and 7.

Figure 3:
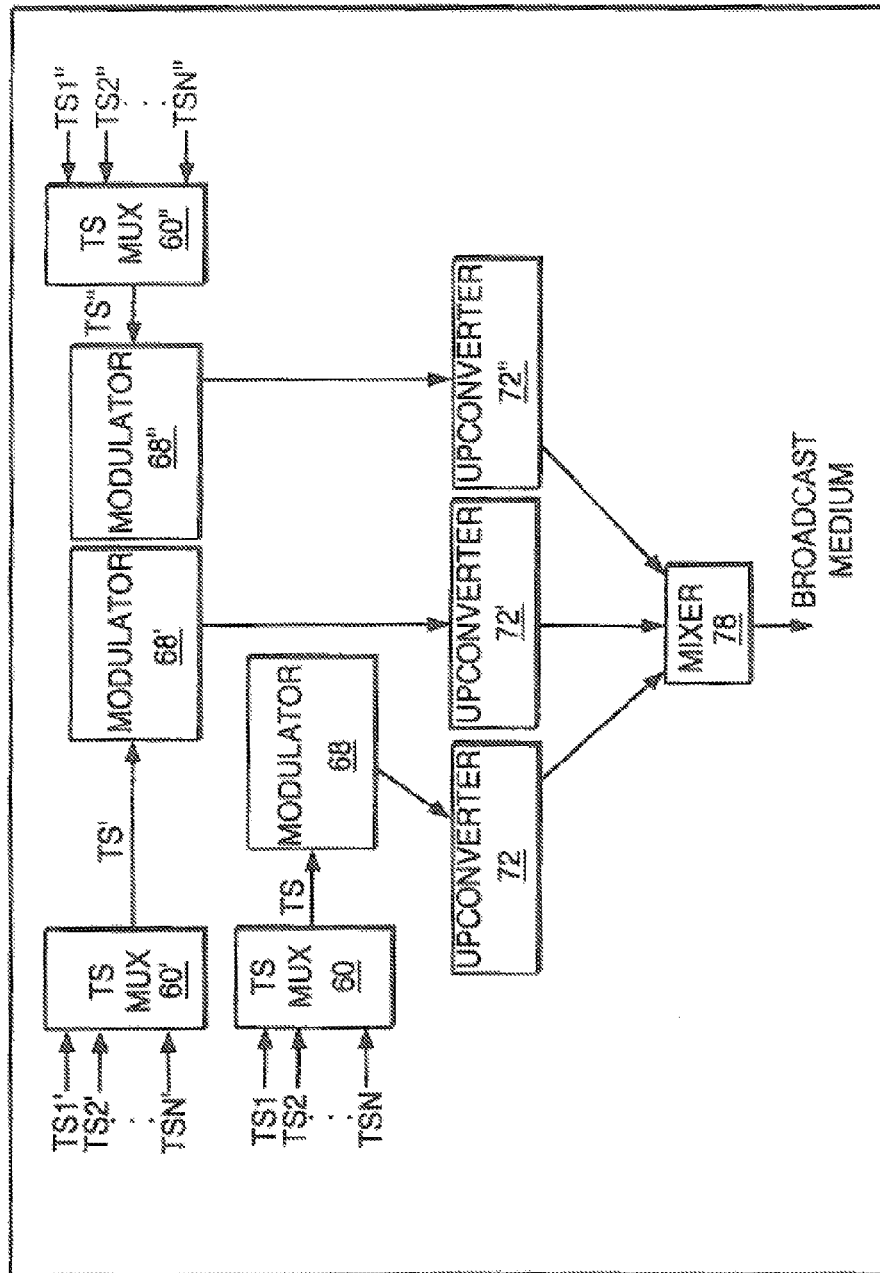
FIG. 3 is a block diagram of an embodiment of the multiplexer system shown in FIG. 1.

Referring to FIG. 3, the multiplexer system 48' is an enhanced version of the multiplexer system shown in FIG. 2A. The multiplexer system 48' is capable of taking multiple transport 29' and augmented transport streams 46, 46" as inputs to produce a single signal that is passed to the broadcast medium. The illustrative multiplexer system 48' includes three transport stream multiplexers 60, 60', 60", three modulators 68, 68', 68", three upconverters 72, 72', 72" and a mixer 78. The multiplexer system 48' includes three duplicate subsystems for converting multiple sets of transport streams into inputs to a mixer 78. Each subsystem includes a multiplexer 60, 60', 60" for combining a set of transport streams (TS1 to TSN), (TS1' to TSN'), (TS1" to TSN") into a single transport stream (TS, TS', TS") to be used as the input signal to a digital modulator (such as a Quadrature Amplitude Modulator (QAM) in the case of a North American digital cable system or an 8VSB Modulator in the case of terrestrial broadcast) 68, 68', 68". In one embodiment each of the transport streams, for example TS1 to TSN, represent a television program. The output signal of the modulator 68, 68', 68" is an intermediate frequency input signal to an upconverter 72, 72', 72" which converts the output signal of the modulator 68, 68', 68" to the proper channel frequency for broadcast. These converted channel frequencies are the input frequencies to a frequency mixer 78 which places the combined signals onto the broadcast medium.

Figure 4:
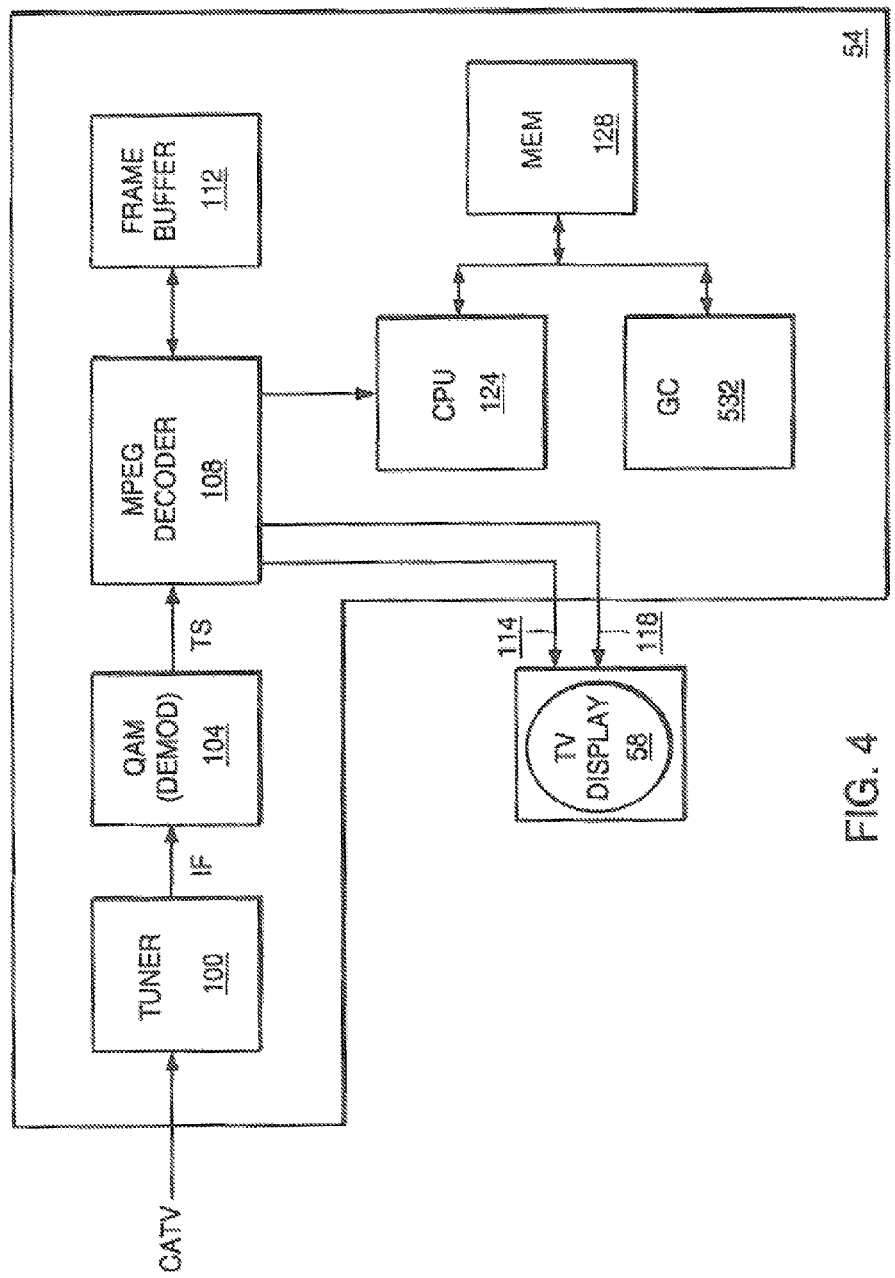
FIG. 4 is a block diagram of an embodiment of the digital receiver shown in FIG. 2.

Referring to FIG. 4, the digital receiver 54 includes a tuner 100 for selecting the broadcast channel of interest from the input broadcast stream and producing an intermediate frequency (IF) signal which contains the video and annotation data for the channel. The IF signal is an input signal to a demodulator 104 which demodulates the IF signal and extracts the information into a transport stream (TS). The transport stream is the input signal to a video decoder 108, such as an MPEG decoder. The video decoder 108 buffers the video frames received in a frame buffer 112. The decoded video 114 and audio 118 output signals from the decoder 108 are input signals to the television display 58.

The annotation data is separated by the video decoder 108 and is transmitted to a CPU 124 for processing. The data is stored in memory 128. The memory also stores a computer program for processing annotation data and instructions from a viewer. When the digital receiver 54 receives instructions from the viewer to display the annotated material, the annotation data is rendered as computer graphic images overlaying some or all of the frame buffer 112. The decoder 108 then transmits the corresponding video signal 114 to the television display 58.

For broadcasts carried by media which can carry signals bi-directionally, such as cable or optical fiber, a connection can be made from the digital receiver 54 to the headend 50 of the broadcast system. In an alternative embodiment for broadcasts carried by unidirectional media, such as conventional television broadcasting or television satellite transmissions, a connection can be made from the digital receiver 54 to the alternative network connection 56 that communicates with a broadcaster or with another entity, without using the broadcast medium. Communication channels for communication with a broadcaster or another entity that are not part of the broadcast medium can be telephone, an internet or similar computer connection, and the like. It should be understood that such non-broadcast communication channels can be used even if bi-directional broadcast media are available. Such communication connections, that carry messages sent from the viewer's location to the broadcaster or to another entity, such as an advertiser, are collectively referred to as backchannels.

Backchannel communications can be used for a variety of purposes, including gathering information that may be valuable to the broadcaster or to the advertiser, as well as allowing the viewer to interact with the broadcaster, the advertiser or others.

In one embodiment the digital receiver 54 generates reports that relate to the viewer's interaction with the annotation information via the remote control device. The reports transmitted to the broadcaster via the backchannel can include reports relating to operation of the remote, such as error reports that include information relating to use of the remote that is inappropriate with regard to the choices available to the viewer, such as an attempt to perform an "illegal" or undefined action, or an activity report that includes actions taken by the viewer that are tagged to show the timestamp of the material that was then being displayed on the television display. The information that can be recognized and transmitted includes a report of a viewers' actions when advertiser-supplied material is available, such as actions by the viewer to access such material, as well as actions by the viewer terminating such accession of the material, for example, recognizing the point at which a viewer cancels an accession attempt. In some embodiments, the backchannel can be a store-and-forward channel.

The information that can be recognized and transmitted further includes information relating to a transaction that a viewer wishes to engage in, for example, the placing of an order for an item advertised on a broadcast (e.g., a shirt) including the quantity of units, the size, the color, the viewer's credit information and/or Personal Identification Number (PIN), and shipping information. The information that can be recognized and transmitted additionally includes information relating to a request for a service, for example a request to be shown a pay-per-view broadcast, including identification of the service, its time and place of delivery, payment information, and the like. The information that can be recognized and transmitted moreover includes information relating to non-commercial information, such as political information, public broadcasting information such as is provided by National Public Radio, and requests to access data repositories, such as the United States Patent and Trademark Office patent and trademark databases, and the like.

The backchannel can also be used for interactive communications, as where a potential purchaser selects an item that is out of stock, and a series of communications ensues regarding the possibility of making an alternative selection, or whether and for how long the viewer is willing to wait for the item to be restocked. Other illustrative examples of interactive communication are the display of a then current price, availability of a particular good or service (such as the location of seating available in a stadium at a specific sporting event, for example, the third game of the 2000 World Series), and confirmation of a purchase.

Figure 5A:
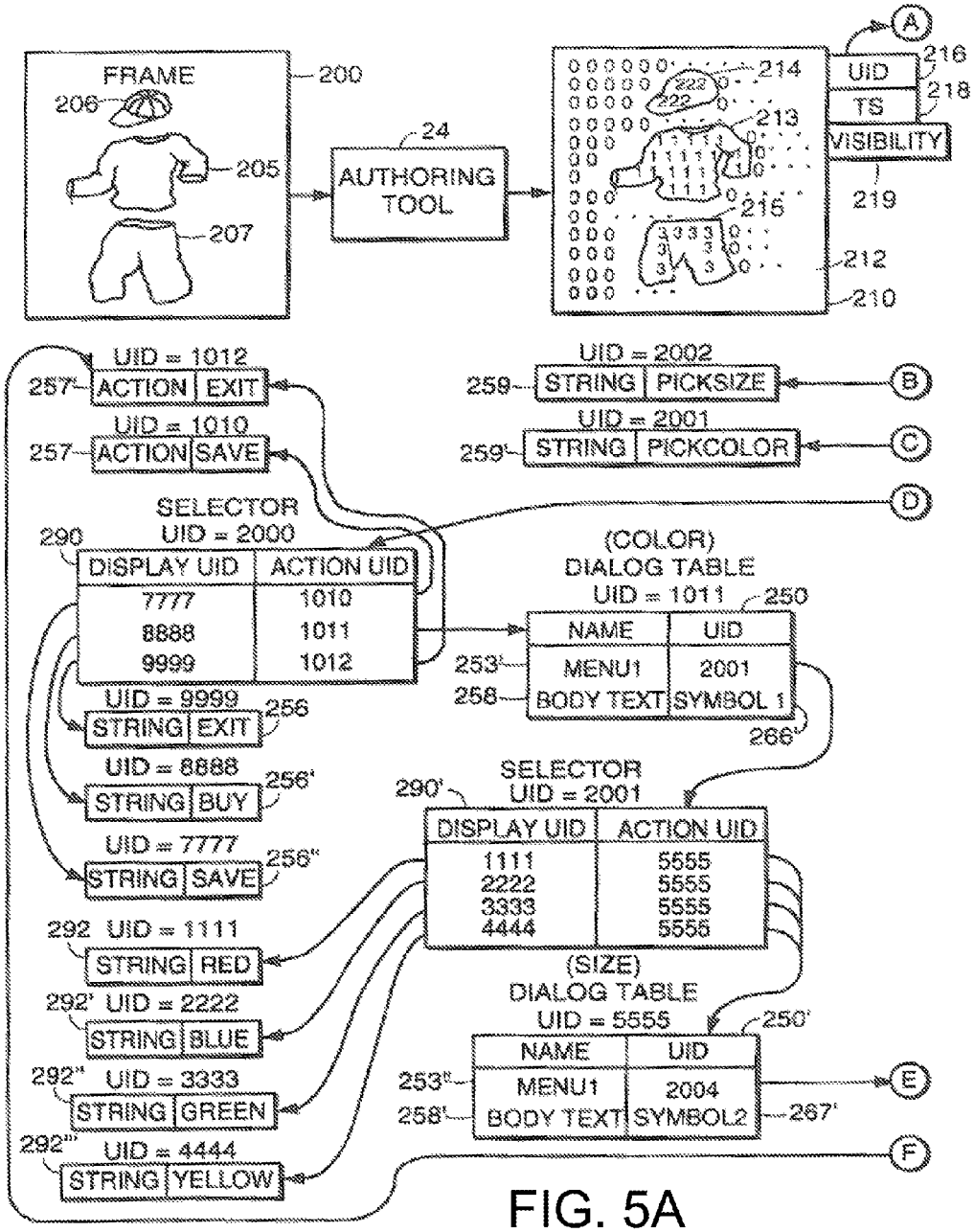
FIGS. 5A-5B are diagrams of an embodiment of the data structures used by the system of FIG. 2 to store annotation data.
Figure 5B:
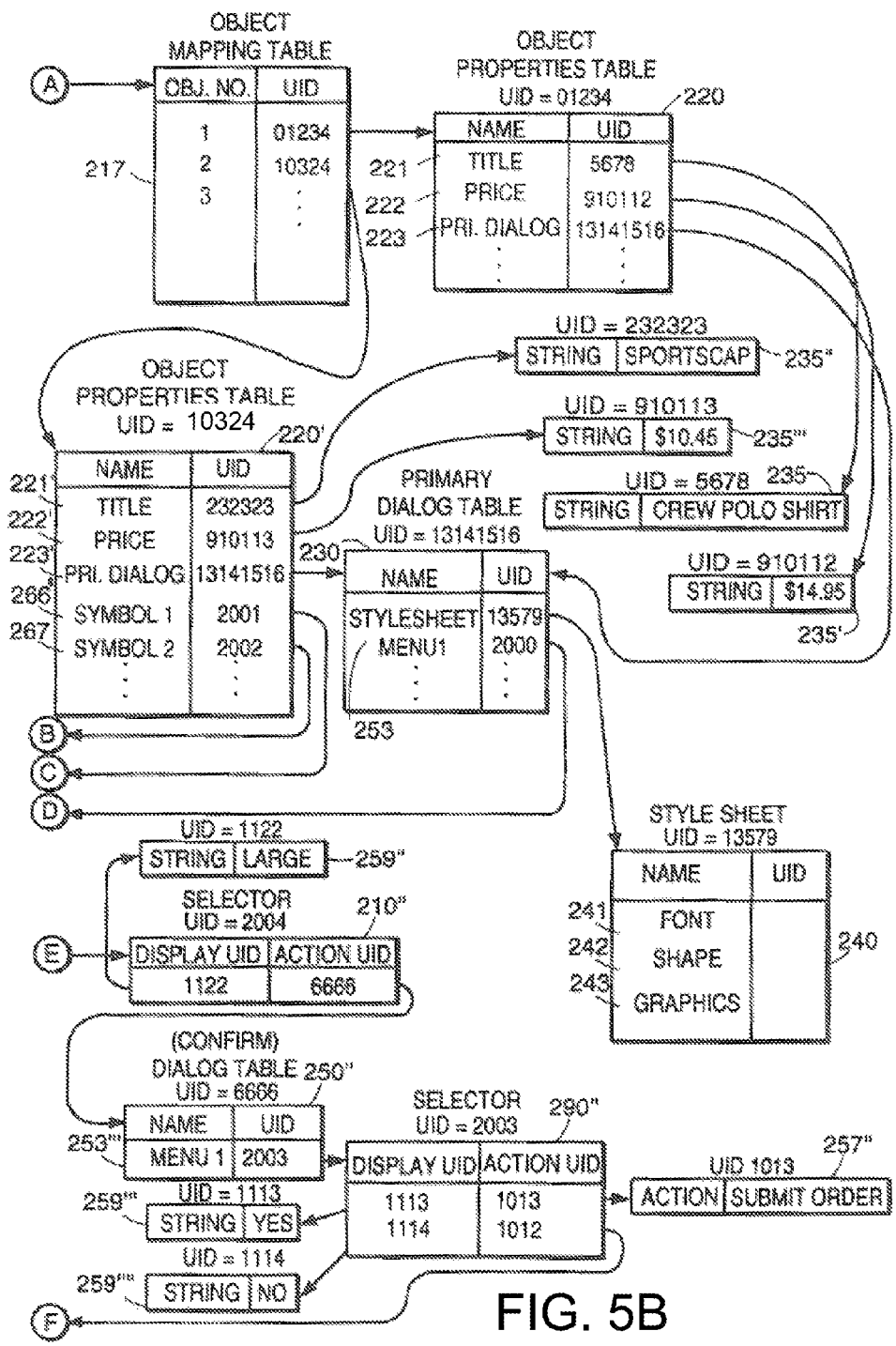

When a viewer begins to interact with the annotation system, the receiver 54 can set a flag that preserves the data required to carry out the interaction with the viewer for so long as the viewer continues the interaction, irrespective of the programmatic material that may be displayed on the video display, and irrespective of a time that the data would be discarded in the absence of the interaction by the viewer. In one embodiment, the receiver 54 sets an "in use bit" for each datum or data structure that appears in a data structure that is providing information to the viewer. A set "in use bit" prevents the receiver 54 from discarding the datum or data structure. When the viewer terminates the interaction, the "in use bit" is reset to zero and the datum or data structure can be discarded when its period of valid use expires. Also present in the data structures of the system but not shown in FIGS. 5A-5B is a expiration timestamp for each data structure by which the system discards that data structure once the time of the program has passed beyond the expiration timestamp. This discarding process is controlled by a garbage collector 532.

In the course of interacting with the annotation system, a viewer can create and modify a catalog. The catalog can include items that the viewer can decide to purchase as well as descriptions of information that the viewer wishes to obtain. The viewer can make selections for inclusion in the catalog from one or more broadcasts. The viewer can 5 modify the contents of the catalog, and can initiate a commercial transaction immediately upon adding an item to the catalog, or at a later time.

The catalog can include entry information about a program that the viewer was watching, and the number of items that were added to the catalog. At a highest level, the viewer can interact with the system by using a device such as a remote control to identify the item of interest, the ordering particulars of interest, such as quantity, price, model, size, color and the like, and the status of an order, such as immediately placing the order or merely adding the item selected to a list of items of interest in the catalog.

At a further level of detail, the viewer can select the entry for the program, and can review the individual entries in the catalog list, including the status of the entry, such as "saved" or "ordered." The entry "saved" means that the item was entered on the list but was not ordered (i.e., the data pertaining to the item have been locked), while "ordered," as the name indicates, implies that an actual order for the item on the list was placed via the backchannel. The viewer can interrogate the list at a still lower level of detail, to see the particulars of an item (e.g., make, model, description, price, quantity ordered, color, and so forth). If the item is not a commercial product, but rather information of interest to the viewer, for example, biographical information about an actor who appears in a scene, an inquiry at the lowest level will display the information. In one embodiment, navigation through the catalog is performed by using the remote control.

The viewer can set up an account for use in conducting transactions such as described above. In one embodiment, the viewer can enter information such as his name, a delivery address, and financial information such as a credit card or debit card number. This permits a viewer to place an order from any receiver that operates according to the system, such as a receiver in the home of a friend or in a hotel room. In another embodiment, the viewer can use an identifier such as a subscription account number and a password, for example the subscription account number associated with the provision of the service by the broadcaster. In such a situation, the broadcaster already has the home address and other delivery information for the viewer, as well as an open financial account with the viewer. In such an instance, the viewer simply places an order and confirms his or her desires by use of the password. In still another embodiment, the viewer can set up a personalized catalog. As an example of such a situation, members of a family can be given a personal catalog and can order goods and services up to spending limits and according to rules that are pre-arranged with the financially responsible individual in the family.

Depending on the location of the viewer and of the broadcast system, the format of the information conveyed over the backchannel can be one of QPSK modulation (as is used in the United States), DVB modulation (as is used in Europe), or other formats. Depending on the need for security in the transmission, the messages transmitted over the backchannel can be encrypted in whole or in part, using any encryption method. The information communicated over the backchannel can include information relating to authentication of the sender (for example, a unique identifier or a digital signature), integrity of the communication (e.g., an error correction method or system such as CRC), information relating to non-repudiation of a transaction, systems and methods relating to prevention of denial of service, and other similar information relating to the privacy, authenticity, and legally binding nature of the communication.

Depending on the kind of information that is being communicated, the information can be directed to the broadcaster, for example, information relating to viewer responses to broadcast material and requests for pay-per-view material; information can be directed to an advertiser, for example, an order for a shirt; and information can be directed to third parties, for example, a request to access a database controlled by a third party. FIGS. 5A-5B show data structures that are used in the invention for storing annotated data information. The data structures store information about the location and/or shape of objects identified in video frames and information that enable viewer interactions with identified objects.

In particular, FIGS. 5A-5B show a frame of video 200 that includes an image of a shirt 205 as a first object, an image of a hat 206 as a second object, and an image of a pair of shorts 207 as a third object. To represent the shape and/or location of these objects, the authoring tool 24 generates a mask 210 which is a two-dimensional pixel array where each pixel has an associated integer value independent of the pixels' color or intensity value. The mask represents the location information in various ways including by outlining or highlighting the object (or region of the display), by changing or enhancing a visual effect with which the object (or region) is displayed, by placing a graphics in a fixed relation to the object or by placing a number in a fixed relation to the object. In this illustrative embodiment, the system generates a single mask 210 for each frame or video image. A collection of video images sharing common elements and a common camera perspective is defined as a shot. In the illustrative mask 210, there are four identified regions: a background region 212 identified by the integer 0, a shirt region 213 identified by the integer 1, a hat region 214 identified by the integer 2, and a shorts region 215 identified by the integer 3. Those skilled in the art will recognize that alternative forms of representing objects could equally well be used, such as mathematical descriptions of an outline of the image. The mask 210 has associated with it a unique identifier (UID) 216, a timestamp 218, and a visibility word 219. The UID 216 refers to an object mapping table 217 associated with the particular mask. The timestamp 218 comes from the video encoder 36 and is used by the system to synchronize the masks with the video frames. This synchronization process is described in more detail below with respect to FIG. 6. The visibility word 219 is used by the system to identify those objects in a particular shot that are visible in a particular video frame. Although not shown in FIGS. 5A-5B, all the other data structures of the system also include an in-use bit as described above.

The illustrative set of data structures shown in FIGS. 5A-5B that enable viewer interactions with identified objects include: object mapping table 217; object properties tables 220, 220'; primary dialog table 230; dialog tables 250, 250', 250"; selectors 290, 290', 290", action identifiers 257, 257', 257"; style sheet 240; and strings 235, 235', 235", 235"', 256, 256', 256", 259, 259', 259", 259"', 259"", 292, 292', 292", 292"'.

The object mapping table 217 includes a region number for each of the identified regions 212, 213, 214, 215 in the mask 210 and a corresponding UID for each region of interest. For example, in the object mapping table 217, the shirt region 213 is stored as the integer value "one" and has associated the UID 01234. The UID 01234 points to the object properties table 220. Also in object mapping table 217, the hat region 214 is stored as the integer value two and has associated the UID 10324. The UID 10324 points to the object properties table 220'. The object mapping table begins with the integer one because the default value for the background is zero.

In general, object properties tables store references to the information about a particular object that is used by the system to facilitate viewer interactions with that object. For example, the object properties table 220 includes a title field 221 with the UID 5678, a price field 222 with the UID 910112, and a primary dialog field 223 with the UID 13141516. The second object properties table 220' includes a title field 221' with the UID 232323, a primary dialog field 223' with the same UID as the primary dialog field 223, and a price field 222' with the UID 910113. The UIDs of the title field 221 and the price field 222 of object properties table 220 point respectively to strings 235, 235' that contain information about the name of the shirt, "crew polo shirt," and its price, "$14.95." The title field 221' of object properties table 220' points the string 235" that contains information about name of the hat, "Sport Cap." The price field of object properties table 220' points to the string 235"'. Those skilled in the art will readily recognize that for a given section of authored video numerous object properties tables will exist corresponding to the objects identified by the authoring tool 24.

The UID of the primary dialog field 223 of object properties table 220 points to a primary dialog table 230. The dialog table 230 is also referenced by the UID of the primary dialog field 223' of the second object properties table 220'. Those skilled in the art will readily recognize that the second object properties table 220' corresponds to another object identified within the program containing the video frame 200. In general, dialog tables 230 structure the text and graphics boxes that are used by the system in interacting with the viewer. Dialog tables 230 act as the data model in a model-view-controller programming paradigm. The view seen by a viewer is described by a stylesheet table 240 with the UID 13579, and the controller component is supplied by software on the digital receiver 54. The illustrative primary dialog table 230 is used to initiate interaction with a viewer. Additional examples of dialog tables include boxes for indicating to the colors 250 or sizes 250' that available for a particular item, the number of items he or she would like to purchase, for confirming a purchase 250", and for thanking a viewer for his or her purchase. Those skilled in the art will be aware that this list is not exhaustive and that the range of possible dialog tables is extensive.

The look and feel of a particular dialog table displayed on the viewer's screen is controlled by a stylesheet. The stylesheet controls the view parameters in the model-view-controller programming paradigm, a software development paradigm well-known to those skilled in the art. The stylesheet field 232 of dialog table 230 contains a UID 13579 that points to the stylesheet table 240. The stylesheet table 240 includes a font field 241, a shape field 242, and graphics field 243. In operation, each of these fields have a UID that points to the appropriate data structure resource. The font field 241 points to a font object, the shape field 242 points to an integer, and the graphics field 243 points to an image object, discussed below. By having different stylesheets, the present system is easily able to tailor the presentation of information to a particular program. For example, a retailer wishing to advertise a shirt on two programs targeted to different demographic audiences would only need to enter the product information once. The viewer interactions supported by these programs would reference the same data except that different stylesheets would be used.

The name-UID pair organization of many of the data structures of the current embodiment provides compatibility advantages to the system. In particular, by using name-UID pairs rather than fixed fields, the data types and protocols can be extended without affecting older digital receiver software and allows multiple uses of the same annotated television program.

The flexibility of the current inventive system is enhanced by the system's requirement that the UIDs be globally unique. In the illustrative embodiment, the UIDs are defined as numbers where the first set of bits represents a particular database license and the second set of bits represents a particular data structure element. Those skilled in the art will recognize that this is a particular embodiment and that multiple ways exist to ensure that the UIDs are globally unique.

The global uniqueness of the UIDs has the advantage that, for example, two broadcast networks broadcasting on the same cable system can be certain that the items identified in their programs can be distinguished. It also means that the headend receiver 50 is able to retrieve data from databases 30, 33 over the network 31 for a particular object because that object has an identifier that is unique across all components of the system. While the global nature of the UIDs means that the system can ensure that different objects are distinguishable, it also means that users of the current inventive system can choose not to distinguish items when such operation is more efficient. For example, a seller selling the same shirt on multiple programs only needs to enter the relevant object data once, and, further, the seller can use the UID and referenced data with its supplier thereby eliminating additional data entry overhead.

In the present embodiment of the current system, there are four defined classes of UIDs: null UIDs; resource UIDs; non-resource UIDs; and extended UIDs. The null UID is a particular value used by the system to indicate that the UID does not point to any resource. Resource UIDs can identify nine distinct types of resources: object mapping tables; object property tables; dialog tables; selectors; stylesheets; images; fonts; strings; and vectors. Selector data structures and vector resources are discussed below. Image resources reference graphics used by the system. The non-resource UIDs include four kinds of values: color values; action identifiers; integer values; and symbols. The action identifiers include "save/bookmark," "cancel," "next item, "previous item, "submit order," and "exit," among other actions that are taken by the viewer. Symbols can represent names in a name-UID pair; the system looks up the name in the stack and substitutes the associated UID. Non-resource UIDs contain a literal value. Extended UIDs provide a mechanism by which the system is able increase the size of a UID. An extended UID indicates to the system that the current UID is the prefix of a longer UID.

When the system requires an input from the viewer it employs a selector 290 data structure. The selector 290 data structure is a table of pairs of UIDs where a first column includes UIDs of items to be displayed to the viewer and a second column includes UIDs of actions associated with each item. When software in the digital receiver 54 encounters a selector 290 data structure it renders on the viewer's screen all of the items in the first column, generally choices to be made by the viewer. These items could be strings, images, or any combination of non-resource UIDs. Once on the screen, the viewer is able to scroll up and down through the items. If the viewer chooses one of the items, the software in the digital receiver 54 performs the action associated with that item. These actions include rendering a dialog box, performing a non-resource action identifier, or rendering another selector 290' data structure. Selectors are referenced by menu 1 fields 253, 253', 253", 253"'.

In operation, when a viewer selects an object and navigates through a series of data structures, the system places each successive data structure used to display information to a viewer on a stack in the memory 128. For example consider the following viewer interaction supported by the data structures shown in FIGS. 5A-5B. First a viewer selects the hat 214 causing the system to locate the object properties table 220' via the object mapping table 217 and to place the object properties table 220' on the stack. It is implicit in the following discussion that each data structure referenced by the viewer is placed on the stack.

Next the system displays a primary dialog table that includes the title 235" and price 235"' of the hat and where the style of the information presented to the viewer is controlled by the stylesheet 240. In addition the initial display to the viewer includes a series of choices that are rendered based on the information contained in the selector 290. Based on the selector 290, the system presents the viewer with the choices represented by the strings "Exit" 256, "Buy" 256', and "Save" 256" each of which is respectively referenced by the UIDs 9999, 8888, and 7777. The action identifiers Exit 257' and Save 257 are referenced to the system by the UIDs 1012 and 1010 respectively.

When the viewer selects the "Buy" string 256', the system uses the dialog table 250, UID 1011, to display the color options to the viewer. In particular, the selector 290' directs the system to display to the viewer the strings "Red" 292, "Blue" 292', "Green" 292", and "Yellow" 292"', UIDs 1111, 2222, 3333, 4444 respectively. The title for the dialog table 250 is located by the system through the variable Symbol1 266. When the object properties table 220' was placed on the stack, the Symbol1 266' was associated with the UID 2001. Therefore, when the system encounters the Symbol1 266' it traces up through the stack until it locates the Symbol1 266' which in turn directs the system to display the string "Pick Color" 259' via the UID 2001.

When the viewer selects the "Blue" 2222 string 292', the system executes the action identifier associated with the UID 5555 and displays a dialog table labeled by the string "Pick Size" 259 located through Symbol2, UID 2002. Based on the selector 290" located by the UID 2003, the system renders the string "Large" 259", UID 1122, as the only size available. If the viewer had selected another color, he would have been directed to the same dialog table, UID 5555, as the hat is only available in large. After the viewer selects the string "Large" 259", the systems presents the viewer with the dialog table 250", UID 6666, to confirm the purchase. The dialog table 250" use the selector 290"', UID 2003, to present to the viewer the strings "Yes" and "No", UIDs 1113 and 1114 respectively. After the viewer selects the "Yes" string 259"', the system transmits the transaction as directed by the action identifier submit order 257", UID 1013. Had the viewer chosen the "No" strong 259" in response to the confirmation request, the system would have exited the particular viewer interaction by executing the action identifier exit 257'. As part of the exit operation, the system would have dumped from the stack the object properties table 220' and all of the subsequent data structures placed on the stack based on this particular interaction with the system by the viewer. Similarly, after the execution of the purchase request by the system, it would have dumped the data structures from the stack.

If an action requires more than one step, the system employs a vector resource which is an ordered set of UIDs. For example, if a viewer wishes to save a reference to an item that he or she has located, the system has to perform two operations: first it must perform the actual save operation indicated by the non-resource save UID and second it must present the viewer with a dialog box indicating that the item has been saved. Therefore the vector UID that is capable of saving a reference would include the non-resource save UID and a dialog table UID that points to a dialog table referencing the appropriate text.

A particular advantage of the current inventive system is that the data structures are designed to be operationally efficient and flexible. For example, the distributed nature of the data structures means that only a minimum amount of data needs to be transmitted. Multiple data structure elements, for example the object properties tables 220, 220', can point to the same data structure element, for example the dialog table 230, and this data structure element only needs to be transmitted once. The stack operation described functions in concert with the distributed nature of the data structure in that, for example, the hat 214 does not have its own selector 290 but the selector 290 can still be particularized to the hat 214 when displayed. The distributed nature of the data structures also has the advantage that individual pieces of data can be independently modified without disturbing the information stored in the other data structures.

Another aspect of the current inventive system that provides flexibility is an additional use of symbols as a variable datatype. In addition to having a value supplied by a reference on the stack, a symbol can reference a resource that can be supplied at some time after the initial authoring process. For example, a symbol can direct the DTV Broadcast Infrastructure 12 to supply a price at broadcast time. This allows, for example, a seller to price an object differently depending on the particular transmitting cable system.

A further aspect of the flexibility provided by the distributed data structure of the current invention is that it supports multiple viewer interaction paradigms. For example, the extensive variation in dialog tables and the ordering of their linkage means that the structure of the viewer's interaction is malleable and easily controlled by the author.

Another example of the variation in a viewer's experience supported by the system is its ability to switch between multiple video streams. This feature exploits the structure of a MPEG2 transport stream which is made up of multiple program streams, where each program stream can consist of video, audio and data information. In a MPEG2 transport stream, a single transmission at a particular frequency can yield multiple digital television programs in parallel. As those skilled in the art would be aware, this is achieved by associating a program mapping table, referred to as a PMT, with each program in the stream. The PMT identifies the packet identifiers (PIDs) of the packets in the stream that correspond to the particular program. These packets include the video, audio, and data packets for each program.

Figure 5C:
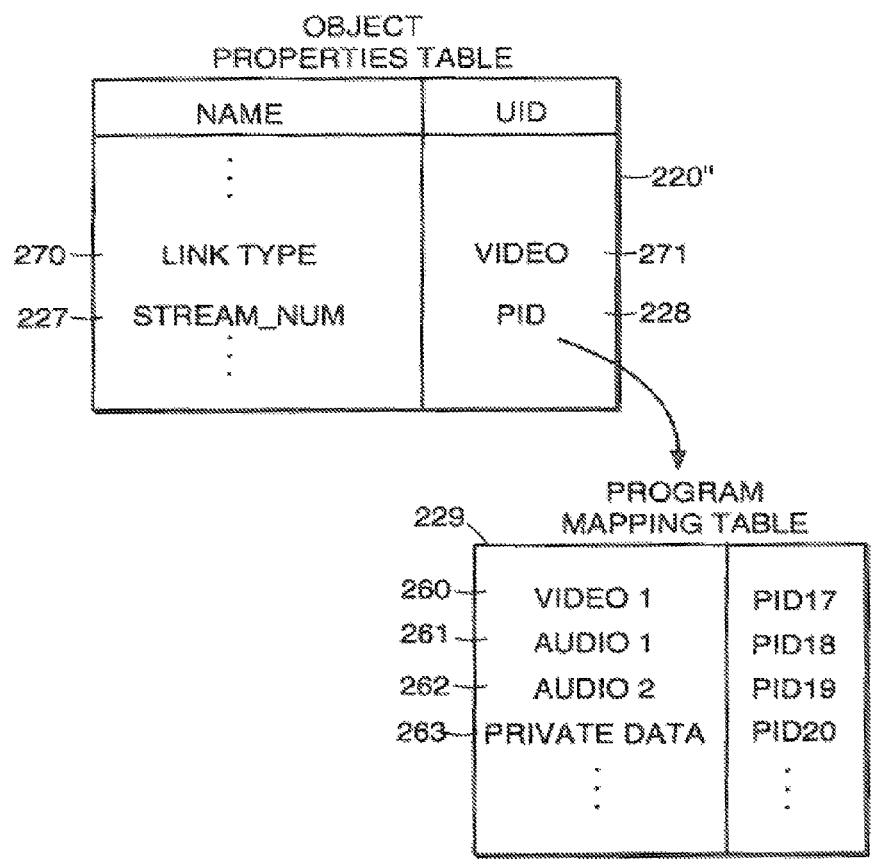
FIG. 5C is a block diagram of an object properties table data structure and a program mapping table data structure.

Referring to FIG. 5C, there is shown an object properties table 220" containing a link type field 270 having a corresponding link type entry in the UID field and a stream_num field 227 with a corresponding PID 228. To enable video stream switching, the authoring tool 24 selects the PID 228 corresponding to the PID of a PMT 229 of a particular program stream. When the object corresponding to the object properties table 220" is selected, the digital receiver 54 uses the video link entry 271 of the link type field 270 to determine that the object is a video link object. The digital receiver 54 then replaces the PID of the then current PMT with the PID 228 of the PMT 229. The digital receiver 54 subsequently uses the PMT 229 to extract data corresponding to the new program. In particular the program referred to by the PMT 229 includes a video stream 260 identified by PID17, two audio streams 261, 262 identified by PID18 and PID19, and a private data stream 263 identified by PID2O. In this way the viewer is able to switch between different program streams by selecting the objects associated with those streams.

Figure 6:
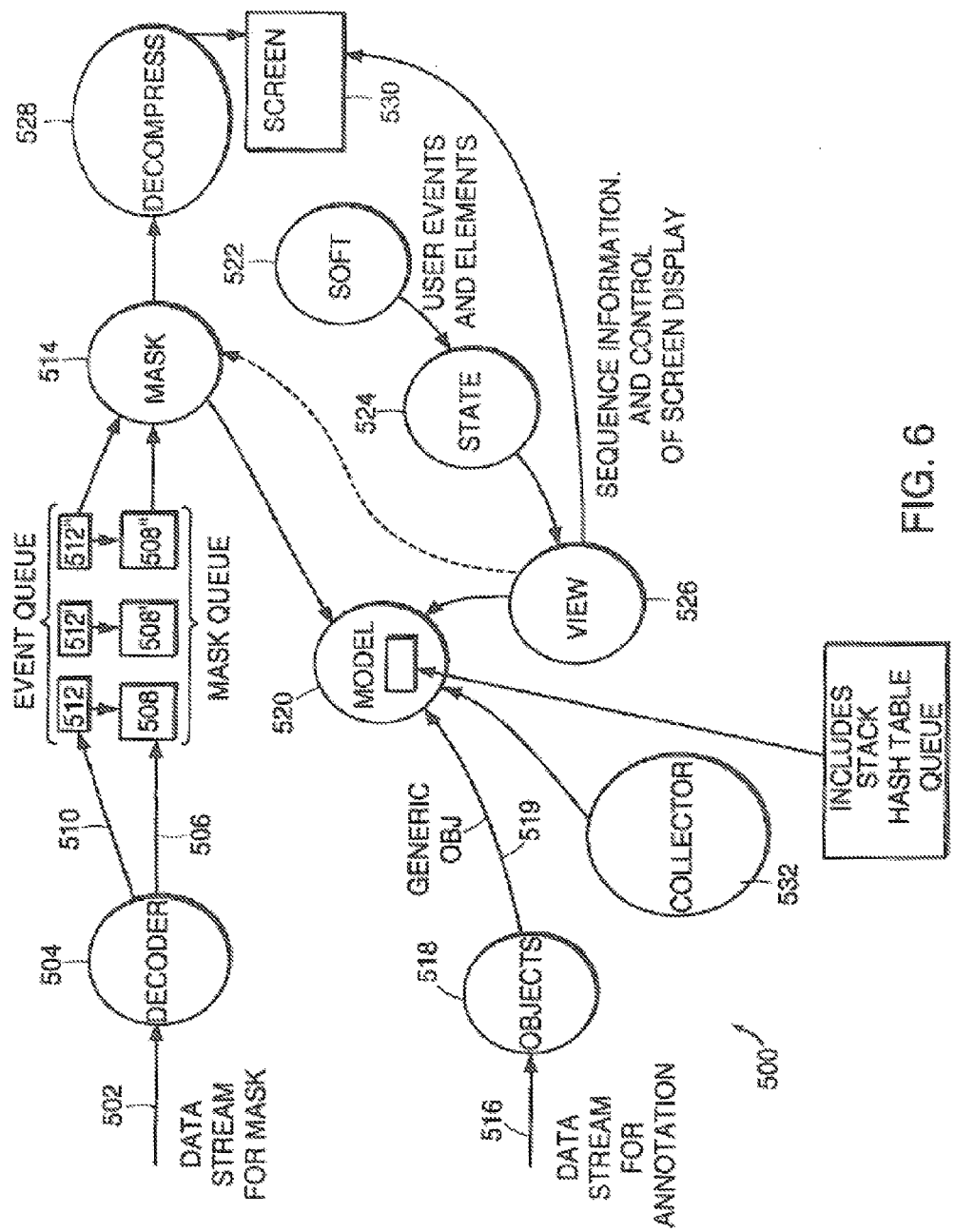
FIG. 6 is a state diagram of the data flow of an embodiment of the system shown in FIG. 2.

FIG. 6 is a flow diagram 500 of the data flow and flow control of an embodiment of the system shown in FIG. 2. FIG. 6 shows sequences of steps that occur when a viewer interacts with the hardware and software of the system. In FIG. 6, a stream 502 of data for masks is decoded at a mask decoder 504. The decoded mask information 506 is placed into a buffer or queue as masks 508, 508', 508". In parallel with the mask information 506, a stream 510 of events, which may be thought of as interrupts, are placed in an event queue as events 512, 512', 512", where an event 512 corresponds to a mask 508 in a one-to-one correspondence. A thread called mask 514 operates on the masks 508. The mask 514 thread locates the mask header, assembles one or more buffers, and handles the mask information in the queue to generate mask overlays.

In order to display mask information, a thread called decompress 528 decodes and expands a mask, maintained for example in (320 by 240) pixel resolution, to appropriate size for display on a video screen 530, for example using (640 by 480) pixel resolution. The decompress thread 528 synchronizes the display of mask overlays to the video by examining a timestamp that is encoded in the mask information and comparing it to the timestamp of the current video frame. If the mask overlay frame is ahead of the video frame, the decompress thread sleeps for a calculated amount of time representing the difference between the video and mask timestamps. This mechanism keeps the masks in exact synchronization with the video so that masks appear to overlay video objects.

A second stream 516 of data for annotations is provided for a second software thread called objects 518. The objects data stream 516 is analyzed and decoded by the objects 518 thread, which decodes each object and incorporates it into the object hierarchy. The output of the objects 518 thread is a stream of objects 519 that have 10 varying characteristics, such as shape, size, and the like.

A thread called model 520 combines the masks 508 and the objects 519 to form a model of the system. The mask information includes a unique ID for every object that is represented in the mask overlay. The unique IDs correspond to objects that are stored in the model. The model 520 thread uses these unique IDs to synchronize, or match, the corresponding information.

The model 520 thread includes such housekeeping structures as a stack, a hash table, and a queue, all of which are well known to those of ordinary skill in the software arts. For example, the stack can be used to retain in memory a temporary indication of a state that can be reinstituted or a memory location that can be recalled. A hash table can be used to store data of a particular type, or pointers to the data. A queue can be used to store a sequence of bits, bytes, data or the like. The model 520 interacts with a thread called view 526 that controls the information that is displayed on a screen 530 such as a television screen. The view 526 thread uses the information contained in the model 520 thread, which keeps track of the information needed to display a particular image, with or without interactive content. The view 526 thread also interacts with the mask 514 thread, to insure that the proper information is made available to the display screen 530 at the correct time.

A thread called soft 522 controls the functions of a state machine called state 524. The details of state 524 are discussed more fully with regard to FIG. 7. State 524 interacts with the thread view 526.

A garbage collector 532 is provided to collect and dispose of data and other information that becomes outdated, for example data that has a timestamp for latest use that corresponds to a time that has already passed. The garbage collector 532 can periodically sweep the memory of the system to remove such unnecessary data and information and to recover memory space for storing new data and information. Such garbage collector software is known in the software arts.

Figure 7:
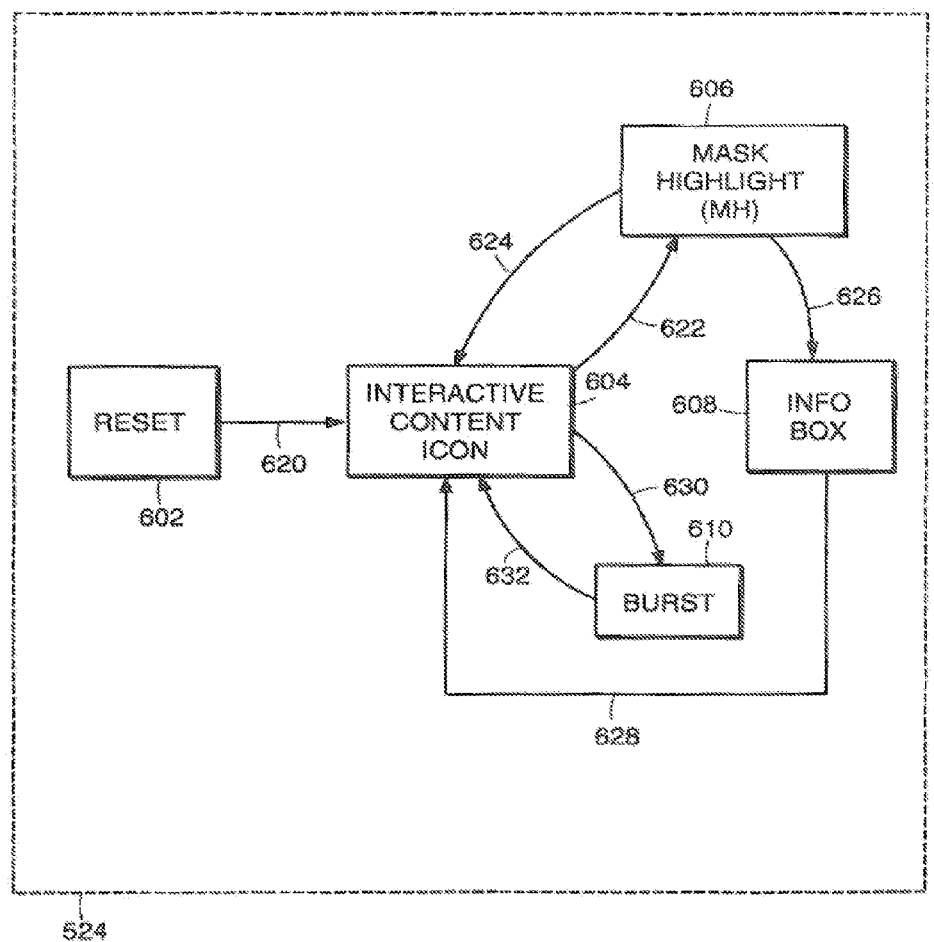
FIG. 7 depicts the interactions between and among states within the state machine depicted in FIG. 6 of an embodiment of the invention.

FIG. 7 depicts the interactions between and among states within the state state machine state 524. The state state machine 524 includes a reset 602 which, upon being activated, brings the state state machine 524 to a refreshed start up condition, setting all adjustable values such as memory contents, stack pointers, and the like to default values, which can be stored for use as necessary in ROM, SDRAM, magnetic storage, CD-ROM, or in a protected region of memory. Once the system has been reset, the state of the state state machine 524 transitions to a condition called interactive content icon 604, as indicated by arrow 620. See FIG. 7.

Interactive content icon 604 is a state in which a visual image, similar to a logo, appears in a defined region of the television display 58. The visual image is referred to as an "icon," hence the name interactive content icon for a visual image that is active. The icon is capable of changing appearance or changing or enhancing a visual effect with which the icon is displayed, for example by changing color, changing transparency, changing luminosity, flashing or blinking, or appearing to move, or the like, when there is interactive information available. The viewer of the system can respond to an indication that there is information by pressing a key on a hand-held device. For example, in one embodiment, pressing a right-pointing arrow or a left-pointing arrow (analogous to the arrows on a computer keyboard, or the volume buttons on a hand-held TV remote device) causes the state of the state state machine 524 to change from interactive content icon 604 to mask highlight (MH) 606. The state transition from interactive content icon 604 to MH 606 is indicated by the arrow 622.

In the state MH 606, if one or more regions of an image correspond to material that is available for presentation to the viewer, one such region is highlighted, for example by having a circumscribing line that outlines the region that appears on the video display (see FIG. 1D), or by having the region or a portion thereof change appearance. In one embodiment, if a shirt worn by a man is the object that is highlighted, a visually distinct outline of the shirt appears in response to the key press, or the shirt changes appearance in response to the key press. Repeating the key press, or pressing the other arrow key, causes another object, such as a wine bottle standing on a table, to be highlighted in a similar manner. In general, the objects capable of being highlighted are successively highlighted by successive key presses.

If the viewer takes no action for a predetermined period of time, for example ten seconds, the state of the state state machine 524 reverts to the interactive content icon 604 state, as denoted by the arrow 624. Alternatively, if the viewer activates a button other than a sideways-pointing arrow, such as the "select" button which often appears in the center of navigational arrows on remote controls, the state proceeds from the state MH 606 to a state called info box 608. Info box 608 is a condition wherein information appears in a pop-up box (i.e., an information box). The state transition from MH 606 to info box 608 is indicated by the arrow 626. The information that appears is specified by an advertiser or promoter of the information, and can, for example, include the brand name, model, price, local vendor, and specifications of the object that is highlighted. As an example, in the case of the man's shirt, the information might include the brand of shirt, the price, the range of sizes that are available, examples of the colors that are available, information about one or more vendors, information about special sale offers, information about telephone numbers or email addresses to contact to place an order, and the like.

There are many possible responses that a viewer might make, and these responses lead, via multiple paths, back to the state interactive content icon 604, as indicated generally by the arrow 628. The responses can, for example, include the viewer expressing an indication of interest in the information provided, as by making a purchase of the item described, inquiring about additional information, or by declining to make such a purchase.

While the system is in the interactive content icon 604 state, the viewer can press a burst button, which activates a state called burst 610, causing a transition 630 from interactive content icon 604 to burst 610. In the burst 610 state, the video display automatically highlights in succession all of the objects that currently have associated information that can be presented to a viewer. The highlight period of any one object is brief, of the order of 0.03 to 5 seconds, so that the viewer can assess in a short time which objects may have associated information for presentation. A preferred highlight period is in the range of 0.1 to 0.5 seconds. The burst 610 state is analogous to a scan state for scanning radio receivers, in which signals that can be received at a suitable signal strength are successively tuned in for brief times.

The burst 610 state automatically reverts 632 to the interactive content icon 604 state once the various objects that have associated information have been highlighted. Once the system has returned to the interactive content icon 604 state, the viewer is free to activate an object of interest that has associated information, as described above.

In another embodiment, the burst 610 state can be invoked by a command embedded within a communication. In yet another embodiment, the burst 610 state can be invoked periodically to inform a viewer of the regions that can be active, or the burst 610 state can be invoked when a new shot begins that includes regions that have set visibility bits.

The interactive content icon can be used to provide visual clues to a viewer. In one embodiment, the interactive content icon appears only when there is material for display to the viewer in connection with one or more regions of an image. In other embodiments, the icon can change to convey to the viewer the time remaining until there will be information associated with one or more regions on screen. The icon can include a display containing numbers which represent an amount of time until interaction opportunities begin, such as a display of seconds in a "count down." In one embodiment, the interactive content icon is active when the burst 610 state is invoked. The interactive content icon can take on a shape that signals that the burst 610 state is beginning, for example, by displaying the interactive content icon itself in enhanced visual effect, similar in appearance to the enhanced visual effect that each visible region assumes. In different embodiments, an enhanced visual effect can be a change in color, a change in luminosity, a change in the icon itself, a blinking or flashing of a region of a display, or the like.

Figure 8A:
FIGS. 8A through 8G depict schematically various illustrative examples of embodiments of an interactive content icon according to the invention.
Figure 8B:
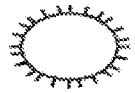
Figure 8C:
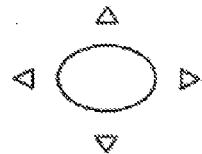

In one embodiment, the interactive content icon is augmented with additional regions, which may be shaped like pointers to points on the compass or like keys of the digital receiver remote control. The augmented regions are displayed, either simultaneously or successively, with an enhanced visual effect. An illustrative example of various embodiments are depicted schematically in FIGS. 8A through 8G. FIG. 8A depicts an inactive interactive content icon. FIG. 8B depicts an active interactive content icon, that is visually enhanced. FIG. 8C depicts a interactive content icon entering the burst state, in which four arrowheads are added pointing to the compass positions North (N), East (E), South (S) and West (W). For example, the augmented regions can be presented in forms that are reminiscent of the shapes of the buttons on a handheld device. In one embodiment, the North (N) and South (S) arrowheads can correspond to buttons that change channels on a video handheld remote, and the East (E) and West (W) arrowheads can correspond to buttons that change volume on a video handheld remote, so as to remind the viewer that pushing those buttons will invoke a burst state response.

Figure 8D:
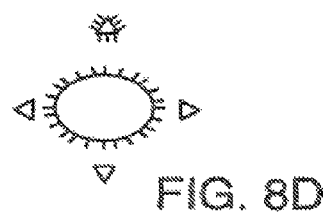
Figure 8E:
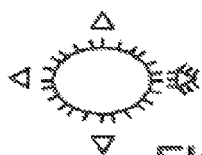
Figure 8F:
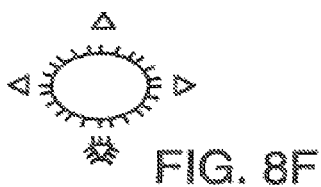
Figure 8G:
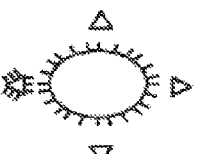

FIG. 8D depicts a interactive content icon in the active burst state, in which the interactive content icon itself and the arrowhead pointing to the compass position North (N) are displayed with enhanced visual effects. FIG. 8E depicts a interactive content icon in the active burst state, in which the interactive content icon itself and the arrowhead pointing to the compass position East (E) are displayed with enhanced visual effects. FIG. 8F depicts a interactive content icon in the active burst state, in which the interactive content icon itself and the arrowhead pointing to the compass position South (S) are displayed with enhanced visual effects. FIG. 8G depicts a interactive content icon in the active burst state, in which the interactive content icon itself and the arrowhead pointing to the compass position West (W) are displayed with enhanced visual effects.

In another embodiment, the interactive content icon is utilized to educate first-time users of the applications enabled by the inventive system. Once the viewer has begun watching an interactive program, an animation featuring the interactive content icon presents some or all of the possible interaction steps. In one embodiment, the icon is designed to mirror sets of buttons on a video handheld remote. Each button that is mirrored on the device is successively highlighted within the icon and a text label appears which explains the button's functionality.

As the viewer selects objects using his or her handheld television remote when interacting with content, the interactive program icon can also provide the user with feedback about what type of information is associated with each video object. For example, there may be cases where one object in a shot is linked to commerce information and another object is linked to content information, such as a piece of trivia about the object. In one embodiment, when the viewer highlights the first object, the interactive program icon subtly changes to resemble a "shopping cart" or perhaps a "$" sign. When the viewer then activates the second object, the interactive program icon changes to resemble a "?". This is achieved by referencing a mask's OMT when a new object is highlighted to look up the UID of the object's OPT. Information in the OPT describes what kind of information is associated with the object. The application uses a lookup table to associate variations of the interactive program icon with the descriptors found in OPT's. These icon variations are displayed as the interactive program icon depending on the descriptor found in each object's OPT. This also includes changing the appearance of the icon based on information in the "link_type" field within an OPT. In one embodiment, when an object is highlighted, the interactive program icon changes to reflect whether selecting the object will cause text or graphics to display or will cause a switch to occur to another video stream.

The interactive program icon can also be used to indicate to the viewer the number of hyperlinked objects available on screen at any time. This is achieved by analyzing the visibility word in each mask to determine the number of hyperlinked objects and displaying an alphanumeric character over the interactive program icon or displaying a variation on the interactive program icon which represents this information.

As discussed earlier, the information that appears on the video display 58, including the television program and any annotation information that may be made is available, is transmitted from a headend 50 to the digital receiver 54. Video images generally contain much information. In modem high definition television formats, a single video frame may include more than 1000 lines. Each line can comprise more than 1000 pixels. In some formats, a 24-bit integer is required for the representation of each pixel. The transmission of such large amounts of information is burdensome. Compression methods that can reduce the amount of data that needs to be transmitted play a useful role in television communication technology. Compression of data files in general is well known in the computer arts. However, new forms of file compression are used in the invention, which are of particular use in the field of image compression.

One traditional compression process is called "n-length encoding." In this process, each pixel or group of identical pixels that appear in succession in a video line is encoded as an ordered pair comprising a first number that indicates how many identical pixels are to be rendered and a second number that defines the appearance of each such identical pixel. If there are long runs of identical pixels, such a coding process can reduce the total number of bits that must be transmitted. However, in pathological instances, for example where every pixel differs from the pixel that precedes it and the pixel that follows it, the coding scheme can actually require more bits that the number of bits required to represent the pixel sequence itself.

In one embodiment, an improvement on run-length encoding, called "Section Run-Length Encoding," is obtained if two or more successive lines can be categorized as having the same sequence of run lengths with the same sequence of appearance or color. The two or more lines are treated as a section of the video image. An example of such a section is a person viewed against a monochrome background. A transmitter encodes the section by providing a single sequence of colors that is valid for all lines in the section, and then encodes the numbers of pixels per line that have each successive color. This method obviates the repeated transmission of redundant color information which requires a lengthy bit pattern per color.

FIG. 9A depicts an image 700 of a person 705 shown against a monochrome background 710, for example, a blue background. FIG. 9A illustrates several embodiments of compression methods for video images. In FIG. 9A the person has a skin color which is apparent in the region 720. The person is wearing a purple shirt 730 and green pants 740. Different colors or appearances can be encoded as numbers having small values, if the encoder and the decoder use a look-up table to translate the coded numbers to full (e.g., 24-bit) display values. As one embodiment, a background color may be defined, for the purposes of a mask, as a null, or a transparent visual effect, permitting the original visual appearance of the image to be displayed without modification.

In this embodiment of "Section Run-Length Encoding," the encoder scans each row 752, 754, 762, 764, and records the color value and length of each run. If the number of runs and the sequence of colors of the first row 752 of a video frame does not match that of the succeeding row 754, the first row 752 is encoded as being a section of length 1, and the succeeding row 754 is compared to the next succeeding row. When two or more rows do contain the same sequence of colors, the section is encoded as a number of rows having the same sequence of colors, followed by a series of ordered pairs representing the colors and run lengths for the first row of the section. As shown in FIG. 9B for an example having three rows, the first row includes (n) values of pairs of colors and run lengths. The remaining two rows are encoded as run lengths only, and the colors used in the first row of the section are used by a decoder to regenerate the information for displaying the later rows of the section. In one embodiment, the section can be defined to be less than the entire extent of a video line or row.

As an example expressed with regard to FIG. 9A, the illustrative rows 752 and 754, corresponding to video scan lines that include the background 710, a segment of the person's skin 720, and additional background 710. The illustrative rows 752 and 754 both comprise runs of blue pixels, skin-colored pixels, and more blue pixels. Thus, the rows 752 and 754, as well as other adjacent rows that intersect the skin-colored head or neck portion of the person, would be encoded as follows: a number indicating exactly how many rows similar to the lines 752, 754 are in a section defined by the blue background color-skin color-blue background color pattern; a first row encoding comprising the value indicative of blue background color and an associated pixel count, the value indicative of skin color 720 and an associated pixel count, and the value indicative of blue background color and another associated pixel count. The remaining rows in the section would be encoded as a number representing a count of blue background color pixels, a number representative of a count of pixels to be rendered in skin color 720, and a number representing the remaining blue background color pixels.

In another embodiment, a process that reduces the information that needs to be encoded, called "X-Run-Length Encoding," involves encoding only the information within objects that have been identified. In this embodiment, the encoded pixels are only those that appear within the defined object, or within an outline of the object. An encoder in a transmitter represents the pixels as an ordered triple comprising a value, a run length and an offset defining the starting position of the run with respect to a known pixel, such as the start of the line. In a receiver, a decoder recovers the encoded information by reading the ordered triple and rendering the pixels according to the encoded information.

Referring again to FIG. 9A, each of the illustrative lines 752 and 754 are represented in the X-Run-Length Encoding process as an ordered triple of numbers, comprising a number indicative of the skin color 720, a number representing how many pixels should be rendered in skin color 720, and a number indicative of the distance from one edge 712 of the image 700 that the pixels being rendered in skin color 720 should be positioned. An illustrative example is given in FIG. 9C.

In yet another embodiment, a process called "X-Section-Run-Length Encoding," that combines features of the Section Run-Length and X-Run-Length encoding processes is employed. The X-Section-Run-Length Encoding process uses color values and run lengths as coding parameters, but ignores the encoding of background. Each entry in this encoding scheme is an ordered triple of color, run length, and offset values as in X-Run Length Encoding.

The illustrative lines 762 and 764 are part of a section of successive lines that can be described as follows: the illustrative lines 762, 764 include, in order, segments of blue background 710, an arm of purple shirt 730, blue background 710, the body of purple shirt 730, blue background 710, the other arm of purple shirt 730, and a final segment of blue background. Illustrative lines 762, 764 and the other adjacent lines that have the same pattern of colors are encoded as follows: an integer defining the number of lines in the section; the first line is encoded as three triples of numbers indicating a color, a run length and an offset; and the remaining lines in the section are encoded as three ordered doubles of numbers indicating a run length and an offset. The color values are decoded from the sets of triples, and are used thereafter for the remaining lines of the section. Pixels which are not defined by the ordered doubles or triples are rendered in the background color. An illustrative example is shown in FIG. 9D, using three rows.

A still further embodiment involves a process called "Super-Run-Length Encoding." In this embodiment, a video image is decomposed by a CPU into a plurality of regions, which can include sections. The CPU applies the compression processes described above to the various regions, and determines an encoding of the most efficient compression process on a section-by section basis. The CPU then encodes the image on a section-by-section basis, as a composite of the most efficient processes, with the addition of a prepended integer or symbol that indicates the process by which each section has been encoded. An illustrative example of this Super-Run-Length Encoding is the encoding of the image 700 using a combination of run length encoding for some lines of the image 700, X Run-Length Encoding for other lines (e.g., 752, 754) of image 700, X-Section-Run-Length Encoding for still other lines (e.g., 762, 764) of image 700, and so forth.

Other embodiments of encoding schemes may be employed. One embodiment that may be employed involves computing an offset of the pixels of one line from the preceding line, for example shifting a subsequent line, such as one in the vicinity of the neck of the person depicted in FIG. 9A, by a small number of pixels, and filling any undefined pixels at either end of the shifted line with pixels representing the background. This approach can be applied to both run lengths and row position information. This embodiment provides an advantage that an offset of seven or fewer pixels can be represented as a signed four-bit value, with a large savings in the amount of information that needs to be transmitted to define the line so encoded. Many images of objects involve line to line offsets that are relatively modest, and such encoding can provide a significant reduction in data to be transmitted.

Another embodiment involves encoding run values within the confines of an 20 outline as ordered pairs, beginning at one edge of the outline. Other combinations of such encoding schemes will be apparent to those skilled in the data compression arts.

In order to carry out the objectives of the invention, an ability to perform analysis of the content of images is useful in addition to representing the content of images efficiently. Television images comprising a plurality of pixels can be analyzed to determine the presence or absence of persons, objects and features, so that annotations can be assigned to selected persons, objects and features. The motions of persons, objects and features can also be analyzed. An assignment of pixels in an image or a frame to one or more persons, objects, and/or features is carried out before such analysis is performed.

The analysis is useful in manipulating images to produce a smooth image, or one which is pleasing to the observer, rather than an image that has jagged or rough edges. The analysis can also be used to define a region of the image that is circumscribed by an outline having a defined thickness in pixels. In addition, the ability to define a region using mathematical relationships makes possible the visual modification of such a region by use of a visibility bit that indicates whether the region is visible or invisible, and by use of techniques that allow the rendering of all the pixels in a region in a specific color or visual effect. An image is examined for regions that define matter that is of interest. For example, in FIG. 9A, a shirt region 730, a head region 720, and a pants region 740 are identified.

In one embodiment, the pixels in an image or frame are classified as belonging to a region. The classification can be based on the observations of a viewer, who can interact with an image presented in digital form on a digital display device, such as the monitor of a computer. In one embodiment, the author/annotator can mark regions of an image using an input device such as a mouse or other computer pointing device, a touch screen, a light pen, or the like. In another embodiment, the regions can be determined by a computing device such as a digital computer or a digital signal processor, in conjunction with software. In either instance, there can be pixels that are difficult to classify as belonging to a region, for example when a plurality of regions abut one another.

In one embodiment, a pixel that is difficult to classify, or whose classification is 5 ambiguous, can be classified by a process that involves several steps. First, the classification of the pixel is eliminated, or canceled. This declassified pixel is used as the point of origin of a classification shape that extends to cover a plurality of pixels (i.e., a neighborhood) in the vicinity of the declassified pixel. The pixels so covered are examined for their classification, and the ambiguous pixel is assigned to the class having the largest representation in the neighborhood. In one embodiment, the neighborhood comprises next nearest neighbors of the ambiguous pixel. In one embodiment, a rule is applied to make an assignment in the case of ties in representation. In one embodiment, the rule can be to assign the class of a pixel in a particular position relative to the pixel, such as the class of the nearest neighbor closest to the upper left hand corner of the image belonging to a most heavily represented class.

In another embodiment, a pixel that is difficult to classify, or whose classification is ambiguous, can be classified by a process which features a novel implementation of principles of mathematical morphology. Mathematical morphology represents the pixels of an image in mathematical terms, and allows the algorithmic computation of properties and transformations of images, for example, using a digital computer or digital signal processor and appropriate software. The principles of mathematical morphology can be used to create various image processing applications. A very brief discussion of some of the principles will be presented here. In particular, the methods known as dilation and erosion will be described and explained. In general, dilation and erosion can be used to change the shape, the size and some features of regions In addition, some illustrative examples of applications of the principles of mathematical morphology to image processing will be described.

Figure 10A:
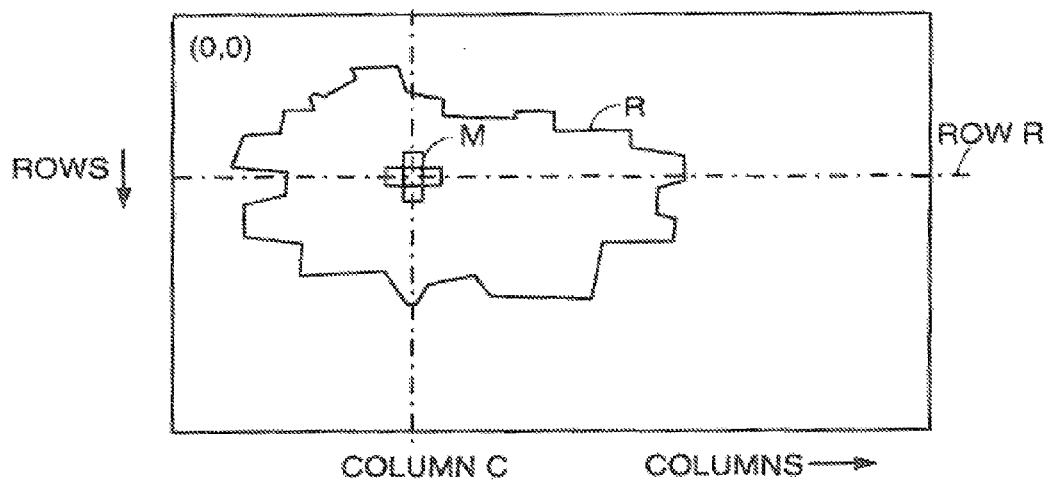
FIG. 10A shows an exemplary region of a frame and an exemplary mask, that are used to describe a two-dimensional image in the terms of mathematical morphology, according to the invention.

Dilation and erosion are fundamental mathematical operations that act on sets of pixels. As an exemplary description in terms of an image in two-dimensional space, consider the set of points of a region R, and a two-dimensional morphological mask M. The illustrative discussion, presented in terms of binary mathematical morphology, is given with respect to FIGS. 10A and 10B. In FIG. 10A, the morphological mask M has a shape, for example, a five pixel array in the shape of a "plus" sign. Morphological masks of different shape can be selected depending on the effect that one wants to obtain. The region R can be any shape; for purposes of illustration, the region R will be taken to be the irregular shape shown in FIG. 10A.

Figure 10B:
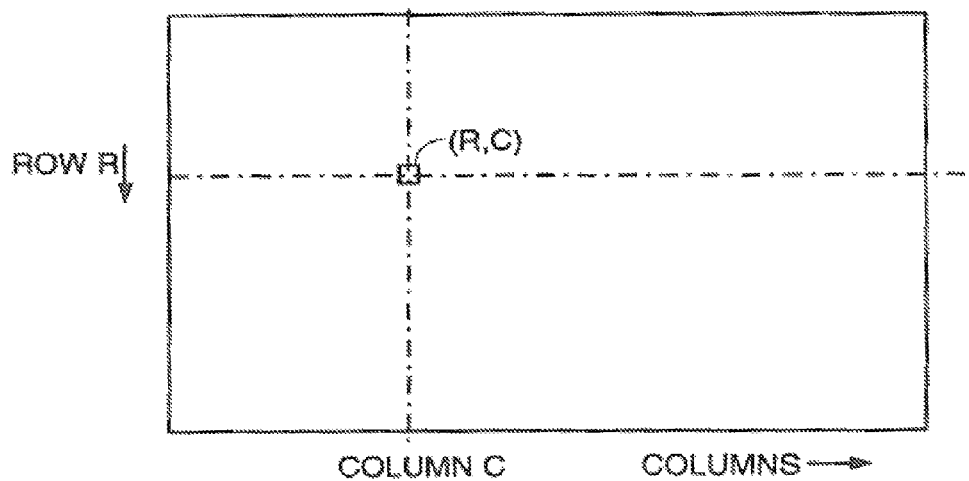
FIG. 10B shows an exemplary resultant image of a two-dimensional mathematical morphology analysis, and a single resultant pixel, according to the principles of the invention.

The morphological mask M moves across the image in FIG. 10A, and the result of the operation is recorded in an array, which can be represented visually as a frame as shown in FIG. 10B. For the illustrative morphological mask, the pixel located at the intersection of the vertical and the horizontal lines of the "plus" sign is selected as a "test" pixel, or the pixel that will be "turned on" (e.g., set to 1) or "turned off" (e.g., set to 0) according to the outcome of the operation applied.

For binary erosion, the mathematical rule, expressed in terms of set theory, can be that the intersection of one or more pixels of the morphological mask M with the region R defines the condition of the pixel to be stored in an array or to be plotted at the position in FIG. 10B corresponding to the location of the test pixel in FIG. 10A. This rule means that, moving the morphological mask one pixel at a time, if all the designated pixel or pixels of the morphological mask M intersect pixels of the region R, the test pixel is turned on and the corresponding pixel in FIG. 10B is left in a turned on condition. The scanning of the mask can be from left to right across each row of the image, starting at the top row and moving to the bottom, for example. Other scan paths that cover the entire image (or at least the region of interest) can be used, as will be appreciated by those of ordinary skill in the mathematical morphology arts. This operation tends to smooth a region, and depending on the size and shape of the morphological mask, can have a tendency to eliminate spiked projections along the contours of a region. Furthermore, depending on the size and shape of the morphological mask, an image can be diminished in size.

Binary dilation can have as a mathematical rule, expressed in terms of set theory, that the union of the morphological mask M with the region R defines the condition of the pixel to be plotted at the position in FIG. 10B corresponding to the location of the test pixel in FIG. 10A. For a given location of the morphological mask M, the pixels of R and the pixels of M are examined, and if any pixel turned on in M corresponds to a pixel turned on in R, the test pixel is turned on. This rule is also applied by scanning the morphological mask across the image as described above, for example, from left to right across each row of the image, again from the top row to the bottom. This operation can have a tendency to cause a region to expand and fill small holes. The operations of dilation and erosion are not commutative, which means that in general, one obtains different results for applying erosion followed by dilation as compared to applying dilation followed by erosion.

Figure 11A:
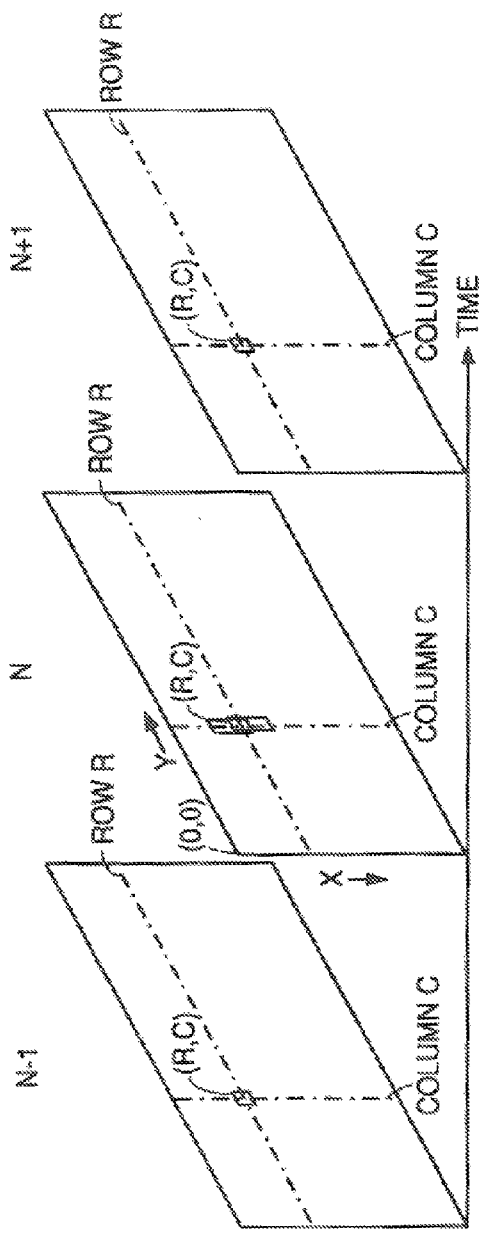
FIG. 11A shows a sequence of exemplary frames and an exemplary mask, that are used to describe a three-dimensional image in the terms of mathematical morphology using time as a dimension, according to the invention.
Figure 11B:
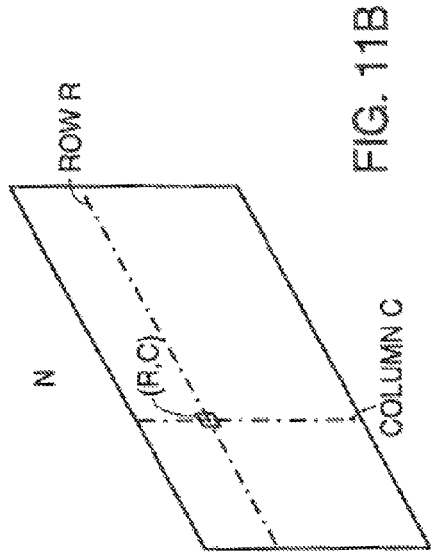
FIG. 11B shows an exemplary resultant frame of a three-dimensional mathematical morphology analysis using time as a dimension, and a single resultant pixel, according to the principles of the invention.

The operations of erosion and dilation, and other operations based upon these fundamental operations, can be applied to sets of pixels defined in space, as are found in a two-dimensional image, as has just been explained. The same operations can be applied equally well for sets of pixels in a time sequence of images, as is shown in FIGS. 11A and 11B. In FIG. 11A, time may be viewed as a third dimension, which is orthogonal to the two dimensions that define each image or frame. FIG. 11A shows three images or frames, denoted as N−1, N, and N+1, where frame N−1 is displayed first, frame N appears next, and finally frame N+1 appears. Each frame can be thought of as having an x-axis and a y-axis. In an illustrative example, each frame comprises 480 horizontal rows of 640 pixels, or columns each. It is conventional to number rows from the top down, and to number columns from the left edge and proceed to the right. The upper left hand corner is row 0, column 0, or (0,0). The x-axis defines the row, with increasing x value as one moves downward along the left side of the frame, and the y-axis defines the column number per row, with increasing y value as one moves rightward along the top edge of the frame. The time axis, along which time increases, is then viewed as proceeding horizontally from left to right in FIG. 11A.

The operations of erosion and dilation in two-dimensional space used a morphological mask, such as the five-pixel "plus" sign, which is oriented in the plane of the image or frame. An operation in the time dimension that uses the two-dimensional five-pixel "plus" sign as a morphological mask can be understood as in the discussion that follows, recognizing that one dimension of the "plus" sign lies along the time axis, and the other lies along a spatial axis. In other embodiments, one could use a one dimensional morphological mask along only the time axis, or a three-dimensional morphological mask having dimensions in two non-collinear spatial directions and one dimension along the time axis.

Let the "test" pixel of the two-dimensional five-pixel "plus" sign morphological mask be situated at row r, column c, or location (r,c), of frame N in FIG. 11A. The pixels in the vertical line of the "plus" sign is at column c of row r−1 (the row above row r) of frame N and column c of row r+1 (the row below row r) of frame N. The pixel to the "left" of the "test" pixel is at row r, column c of frame N−1 of FIG. 11A (the frame preceding frame N), and the pixel to the "right" of the "test" pixel is at row r, column c of frame N+1 of FIG. 11A (the frame following frame N). An operation using this morphological mask thus has its result recorded visually at row r, column c of a frame corresponding to frame N, and the result can be recorded in an array at the corresponding location. However, in this example, the computation depends on three pixels situated in frame N, one pixel situated in frame N−1, and one situated in frame N+1. FIG. 11A schematically depicts the use of the five-pixel "plus" mask on three images or frames that represent successive images in time, and FIG. 11B depicts the result of the computation in a frame corresponding to frame N.

In this inventive system, a novel form of erosion and dilation is applied in which all regions are eroded and dilated in one pass, rather than working on a single region at a time (where the region is labeled '1' and the non-region is '0'), and repeating the process multiple times in the event that there are multiple regions to treat. In the case of erosion, if the input image contains R regions, the pixels of which are labeled 1, 2, . . . r, respectively, then the test pixel is labeled, for example, '3', if and only if all the pixels under the set pixels in the morphological mask are labeled 3. Otherwise, the test pixel is assigned 0, or "unclassified." In the case of dilation, if the input image contains R regions, the pixels of which are labeled 1, 2, . . . r, respectively, then the test pixel is labeled, for example, '3', if and only if the region with the greatest number of pixels is the one with label 3. Otherwise, the test pixel is assigned 0, or "unclassified."

Two dimensional floodfill is a technique well known in the art that causes a characteristic of a two-dimensional surface to be changed to a defined characteristic. For example, two-dimensional floodfill can be used to change the visual effect of a connected region of an image to change in a defined way, for example changing all the pixels of the region to red color. Three-dimensional floodfill can be used to change all the elements of a volume to a defined characteristic. For example, a volume can be used to represent a region that appears in a series of sequential two-dimensional images that differ in sequence number or in time of display as the third dimension.

An efficient novel algorithm has been devised to floodfill a connected three-dimensional volume starting with an image that includes a region that is part of the volume. In overview, the method allows the selection of an element at a two-dimensional surface within the volume, and performs a two-dimensional floodfill on the region containing that selected element. The method selects a direction along the third dimension, determines if a successive surface contains an element within the volume, and if so, performs a two-dimensional floodfill of the region containing such an element. The method repeats the process until no further elements are found, and returns to the region first floodfilled and repeats the process while moving along the third dimension in the opposite direction.

An algorithmic image processing technique has been devised using a three-dimensional flood-fill operator in which the author selects a point within a group of incorrectly classified points. The selected point can be reclassified using a classification method as described earlier. The entire group of pixels contiguous with the selected point is then reclassified to the classification of the selected point. Pixels that neighbor the reclassified pixels in preceding and following frames can also be reclassified.

In one embodiment, the three-dimensional volume to be reclassified comprises two dimensions representing the image plane, and a third dimension representing time. In this embodiment, for every pixel (r, c) in frame N of FIG. 11A that has changed from color A to color B due to the two-dimensional floodfill operation in frame N, if pixel (r, c) in frame N+1 of FIG. 11A is currently assigned color A, then the two-dimensional floodfill is run starting at pixel (r, c) in frame N+1 of FIG. 11A, thereby changing all the contiguous pixels in frame N+1 assigned to color A. Again with reference to FIG. 11A, it is equally possible to begin such a process at frame N and proceed backward in the time dimension to frame N−1. In one embodiment, the three-dimensional flood-fill process is terminated at a frame in which no pixel has a label that requires changing as a result of the flood fill operation. In one embodiment, once three-dimensional floodfill is terminated going in one direction in time, the process is continued by beginning at the initial frame N and proceeding in the opposite direction in time until the process terminates again.

Figure 11C:
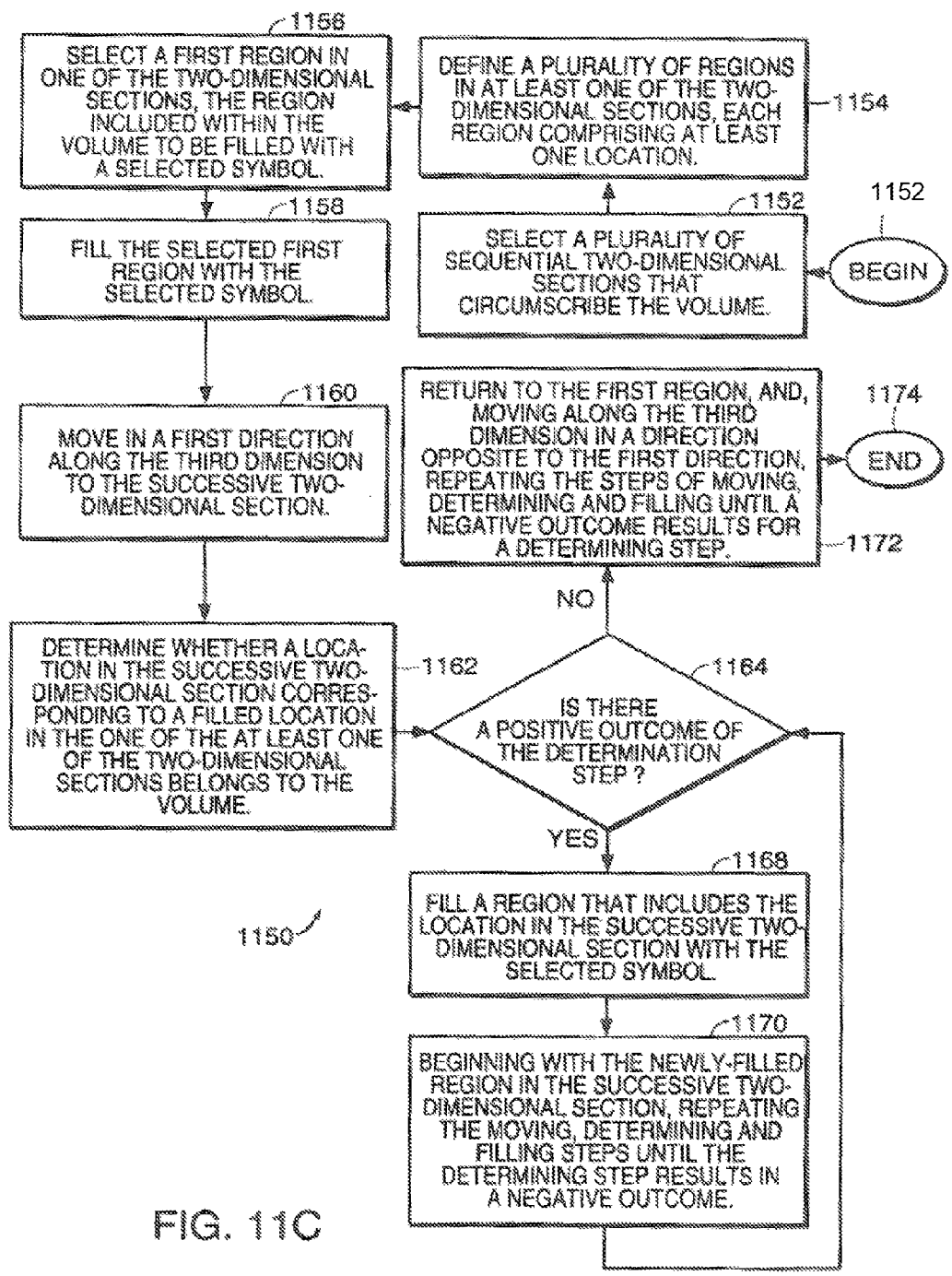
FIG. 11C is a flow diagram showing an illustrative process by which three-dimensional floodfill is accomplished, according to one embodiment of the invention.

FIG. 11C is a flow diagram 1150 showing an illustrative process by which three-dimensional floodfill is accomplished, according to one embodiment of the invention. The process starts at the circle 1152 labeled "Begin." The entity that operates the process, such as an operator of an authoring tool, or alternatively, a computer that analyzes images to locate within images one or more regions corresponding to objects, selects a plurality of sequential two-dimensional sections that circumscribe the volume to be filled in the three-dimensional floodfill process, as indicated by step 1154. In one embodiment, the three-dimensional volume comprises two dimensional sections disposed orthogonally to a third dimension, each two-dimensional section containing locations identified by a first coordinate and a second coordinate. For example, in one embodiment, the two-dimensional sections can be image frames, and the third dimension can represent time or a frame number that identifies successive frames. In one embodiment, the first and second coordinates can represent row and column locations that define the location of a pixel within an image frame on a display.

In step 1156, the process operator defines a plurality of regions in at least one of the two-dimensional sections, each region comprising at least one location. From this point forward in the process, the process is carried out using a machine such as a computer that can perform a series of instructions such as may be encoded in software. The computer can record information corresponding to the definitions for later use, for example in a machine-readable memory. For example, in an image, an operator can define a background and an object of interest, such as shirt 2.

In step 1158, the computer selects a first region in one of the two-dimensional 20 sections, the region included within the volume to be filled with a selected symbol. In one embodiment, the symbol can be a visual effect when rendered on a display, such as a color, a highlighting, a change in luminosity, or the like, or it can be a character such as an alphanumeric character or another such symbol that can be rendered on a display.

In step 1160, the computer that runs the display fills the first region with the selected symbol. There are many different well-known graphics routines for filling a two-dimensional region with a symbol, such as turning a defines region of a display screen to a defined color. Any such well-known two-dimensional graphics routine can be implemented to carry out the two-dimensional filling step.

In step 1162, the computer moves in a first direction along the third dimension to the successive two-dimensional section. In one embodiment, the process operator moves to the image immediately before or after the first image selected, thus defining a direction in time, or in the image sequence.

In step 1164, the computer determines whether a location in the successive two-dimensional section corresponding to a filled location in the two-dimensional section of the previous two-dimensional section belongs to the volume. The process operator looks up information recorded in the definitions of the two dimensional regions accomplished instep 1156.

The computer makes a selection based on the outcome of the determination performed in step 1164. If there is a positive outcome of the determination step 1164, the computer fills a region that includes the location in the successive two-dimensional section with the selected symbol, as indicated at step 1168. As indicated at step 1170, beginning with the newly-filled region in the successive two-dimensional section, the computer repeats the moving step 1162, the determining step 1164 and the filling step 1168 (that is, the steps recited immediately heretofore) until the determining step results in a negative outcome.

Upon a negative outcome of any determining step 1164 heretofore, the computer returns to the first region identified in step 1158 (which has already been filled), and, moving along the third dimension in a direction opposite to the first direction, repeating the steps of moving (e.g., a step similar to step 1162 but going on the opposite direction), determining (e.g., a step such as step 1164) and filling (e.g., a step such as step 1168) as stated above until a negative outcome results for a determining step. This sequence is indicated in summary form at step 1172. At step 1174, the process ends upon a negative outcome of a determining step.

Figure 12A:
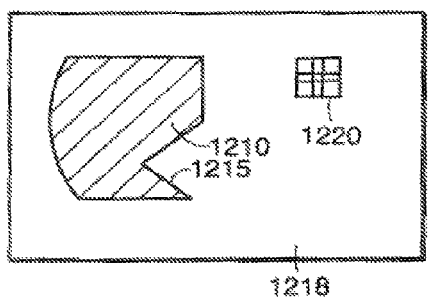
FIGS. 12A-12B is a diagram showing an exemplary application of mathematical morphology analysis that creates an outline of a region, according to the principles of the invention.
Figure 12B:
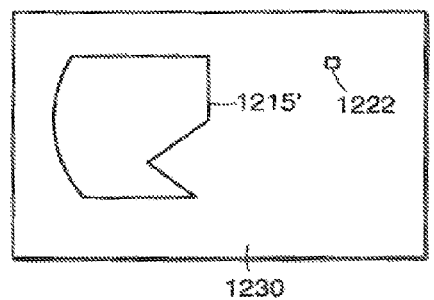

Another application involves creating outlines of regions, for example to allow a 10 region to be highlighted either in its entirety, or to be highlighted by changing the visual effect associated with the outline of the region, or some combination of the two effects. In one embodiment, a method to construct outlines from labeled regions is implemented as depicted in FIGS. 12A-12B. A region 1210 to be outlined having an outline 1215 in input image 1218 is shown in FIG. 12A. A square morphological mask 1220 having an odd number of pixels whose size is proportional to the desired outline thickness is passed over the region 1210. At every position in the input region 1210, the pixels falling within the morphological mask are checked to see if they are all the same. If so, a '0' is assigned to the test pixel in the output image 1230 of FIG. 12B. If a pixel is different from any other pixel within the morphological mask, then the label which falls under the morphological mask's center pixel is assigned to the test pixel in the output image 1230. As the morphological mask 1220 passes over the region 1210, a resulting outline 1215' is generated in output image 1230. In other embodiments, square morphological masks having even numbers of pixels, morphological masks having shapes other than square, and square morphological masks having odd numbers of pixels can be used in which one selects a particular pixel within the morphological mask as the pixel corresponding to the test pixel 1222 in the output image 1230.

It will be understood that those of ordinary skill in using the principles of mathematical morphology may construct the foregoing examples of applications by use of alternative morphological masks, and alternative rules, and will recognize many other similar applications based on such principles.

In a series of related images, or a shot as described previously, such as a sequence of images showing a person sitting on a bench in the park, one or more of the selected objects may persist for a number of frames. In other situations, such as an abrupt change in the image, as where the scene changes to the view perceived by the person sitting on the park bench, some or all of the regions identified in the first scene or shot may be absent in the second scene or shot. The system and method of the invention can determine both that the scene has changed (e.g., a new shot begins) and that one or more regions present in the first scene are not present in the second scene.

Figure 13:
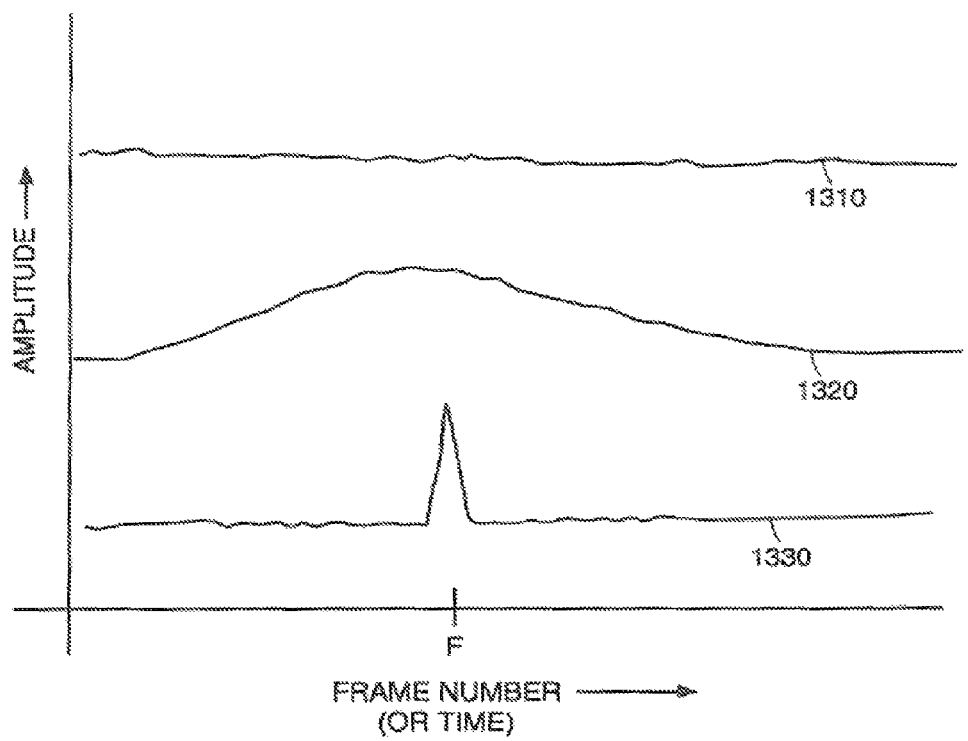
FIG. 13 is a diagram showing three illustrative examples of the evolutions of histograms over successive frames that are indicative of motion, according to the invention.

In one embodiment, the system and method determines that the scene or shot has changed by computing a histogram of pixels that have changed from one image to a successive image and comparing the slope of the successive instances (or time evolution) of the histogram to a predefined slope value. FIG. 13 shows three illustrative examples 20 of the evolutions of histograms over successive frames (or over time). The topmost curve 1310 has a small variation in slope from zero and represents motion at moderate speed. The middle curve 1320 shows a somewhat larger variation in slope and represents sudden motion. The lowermost curve 1330 shows a large variation in slope, and represents a shot change or scene change at frame F. If the slope of the histogram evolution plot exceeds a predetermined value, as does the lowermost curve 1330, the system determines that a shot change has occurred.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of indicating to a viewer of a hyperlinked television broadcast regions of a television broadcast image that have associated therewith hyperlinked information, the method implemented by a receiver comprising:
    displaying an interactive content icon in a first defined region of the television broadcast image;
    receiving a first type of user activation of a user input device in response to the display of the interactive content icon;
    displaying said first defined region within the television broadcast image with a modified visual effect in response to the first type of user activation of the user input device;
    receiving a second type of user activation of the user input device in response to the display of the region within the television broadcast image;
    displaying a second defined region within the television broadcast image with the modified visual effect, in response to receiving the second type of user activation of the user input device;
    receiving a third type of user activation of the user input device in response to the display of the second defined region within the television broadcast image with the modified visual effect;
    displaying an information box within the television broadcast image in response to the third user activation of the user input device; and
    in response to the expiry of a predetermined period of time without the second type or third type of user activation of the user input device, removing said display of said first defined region with the modified visual effect and displaying the interactive content icon in the first defined region.

2. The method of claim 1, further comprising displaying said first defined region within the television broadcast image with the modified visual effect that persists for a period of less than one second.

3. The method of claim 2, wherein the persistence period of the modified visual effect is in the range of one-tenth second to one-quarter second.

4. The method of claim 1, wherein the display of the first defined region with the modified visual effect occurs in response to a request from a viewer.

5. The method of claim 1, wherein the display of the first defined region with the modified visual effect occurs in response to a change in the content of the television broadcast image.

6. The method of claim 1, wherein the display of the first defined region with the modified visual effect occurs in response to a signal associated with said television broadcast.

7. The method of claim 1, wherein said modified visual effect comprises a change in color.

8. The method of claim 1, wherein said modified visual effect comprises addition of an alphanumeric character.

9. The method of claim 1, wherein said modified visual effect comprises a change in luminosity.

10. The method of claim 1, wherein said first defined region is a visible object in the television broadcast image and the first defined region is highlighted with the modified visual effect only after the first user activation of the user input device in response to the display of the interactive content icon.

11. A receiver for indicating to a viewer of a hyperlinked television broadcast regions of a television broadcast image that have associated therewith hyperlinked information, the receiver comprising:
- a display;
- a processor; and
- a memory operably coupled to the processor and having program instructions stored therein, the processor being operable to execute the program instructions to:
  - display an interactive content icon in a first defined region of the television broadcast image;
  - receive a first type of user activation of a user input device in response to the display of the interactive content icon;
  - display said first defined region within the television broadcast image with a modified visual effect in response to the first type of user activation of the user input device;
  - receive a second type of user activation of the user input device in response to the display of the region within the television broadcast image;
  - display a second defined region within the television broadcast image with the modified visual effect, in response the second type of user activation of the user input device;
  - receive a third type of user activation of the user input device in response to the display of the second defined region within the television broadcast image with the modified visual effect;
  - display an information box within the television broadcast image in response to the third user activation of the user input device; and
  - remove said display of said first defined region with the modified visual effect and display the interactive content icon in the first defined region, responsive to the expiry of a predetermined period of time without the second type or third type of user activation of the user input device.

* * * * *

UNITED STATES PATENT AND TRADEMARK OFFICE
CERTIFICATE OF CORRECTION

PATENT NO. : 8,356,329 B2  
APPLICATION NO. : 11/937246  
DATED : January 15, 2013  
INVENTOR(S) : Katcher et al.

Page 1 of 1

It is certified that error appears in the above-identified patent and that said Letters Patent is hereby corrected as shown below:

On Title Page 4, in Item (56), under "OTHER PUBLICATIONS", in Column 1, Line 16, delete "Washington,," and insert -- Washington, --, therefor.

On Title Page 4, in Item (56), under "OTHER PUBLICATIONS", in Column 2, Line 1, delete "Internati onal" and insert -- International --, therefor.

In the Specification

In Column 3, Line 63, delete "data S" and insert -- data 5 --, therefor.

In Column 19, Line 24, delete "modem" and insert -- modern --, therefor.

In Column 19, Line 36, delete ""n-length" and insert -- "run-length --, therefor.

In Column 27, Line 9, delete "12A A" and insert -- 12A. A --, therefor.

Signed and Sealed this  
Eighteenth Day of June, 2013

Teresa Stanek Rea  
*Acting Director of the United States Patent and Trademark Office*